(12) United States Patent
Baek

(10) Patent No.: US 8,678,265 B2
(45) Date of Patent: Mar. 25, 2014

(54) STRIP JOINING APPARATUS FOR PIPE MILL EQUIPMENT

(75) Inventor: Nak Chun Baek, Bucheon-si (KR)

(73) Assignee: Baek Chun Precision Co., Ltd. (KR)

( * ) Notice: Subject to any disclaimer, the term of this patent is extended or adjusted under 35 U.S.C. 154(b) by 29 days.

(21) Appl. No.: 13/466,551

(22) Filed: May 8, 2012

(65) Prior Publication Data

US 2012/0286024 A1 Nov. 15, 2012

(30) Foreign Application Priority Data

May 9, 2011 (KR) .......................... 10-2011-0043537

(51) Int. Cl.
*B23K 37/00* (2006.01)
*B23K 37/04* (2006.01)

(52) U.S. Cl.
USPC ........... 228/5.7; 228/44.3; 228/49.4; 228/170

(58) Field of Classification Search
USPC ........................................................ 228/5.7
See application file for complete search history.

(56) References Cited

U.S. PATENT DOCUMENTS

| | | | | |
|---|---|---|---|---|
| 305,709 | A * | 9/1884 | Parry et al. ........................ | 83/237 |
| 2,936,663 | A * | 5/1960 | Gautron .......................... | 409/138 |
| 3,191,843 | A * | 6/1965 | Tomkins ......................... | 228/5.7 |
| 3,198,413 | A * | 8/1965 | Cooper ........................... | 228/5.7 |
| 3,566,722 | A * | 3/1971 | Audet .............................. | 82/12 |
| 3,593,907 | A * | 7/1971 | Hahne ............................ | 228/5.7 |
| 4,304,977 | A * | 12/1981 | Hanai et al. ..................... | 219/97 |
| 4,513,899 | A * | 4/1985 | Ledgerwood ................. | 226/141 |
| 4,973,089 | A | 11/1990 | Wheeler et al. | |
| 6,955,287 | B2 * | 10/2005 | Horii et al. ................. | 228/141.1 |

FOREIGN PATENT DOCUMENTS

| | | |
|---|---|---|
| JP | 03-146269 | 6/1991 |
| JP | 05-57346 | 3/1993 |
| JP | 05337726 A * | 12/1993 |
| KR | 20040041396 | 5/2004 |
| KR | 100649652 | 11/2006 |
| KR | 20080050034 | 6/2008 |

* cited by examiner

*Primary Examiner* — Keith Walker
*Assistant Examiner* — Jacky Yuen
(74) *Attorney, Agent, or Firm* — Cantor Colburn LLP

(57) ABSTRACT

Disclosed herein is a strip joining apparatus for pipe mill equipment. The strip joining apparatus cuts a trailing end of a preceding steel strip and a leading end of a following steel strip, and puts the cut surfaces of the two steel strips into contact with each other, and then welds them to each other. Particularly, a cutting blade of a first cutting unit and a cutting blade of a second cutting unit are inclined in the downward direction at predetermined angles relative to each other. Thus, the ends of the two steel strips, which are respectively cut by the cutting blades, define a 'V'-shape groove. In this state, the cut ends of the two steel strips are put in close contact with each other and are welded to each other, so that the quality of welding of the junction between the thick strips can be enhanced.

6 Claims, 25 Drawing Sheets

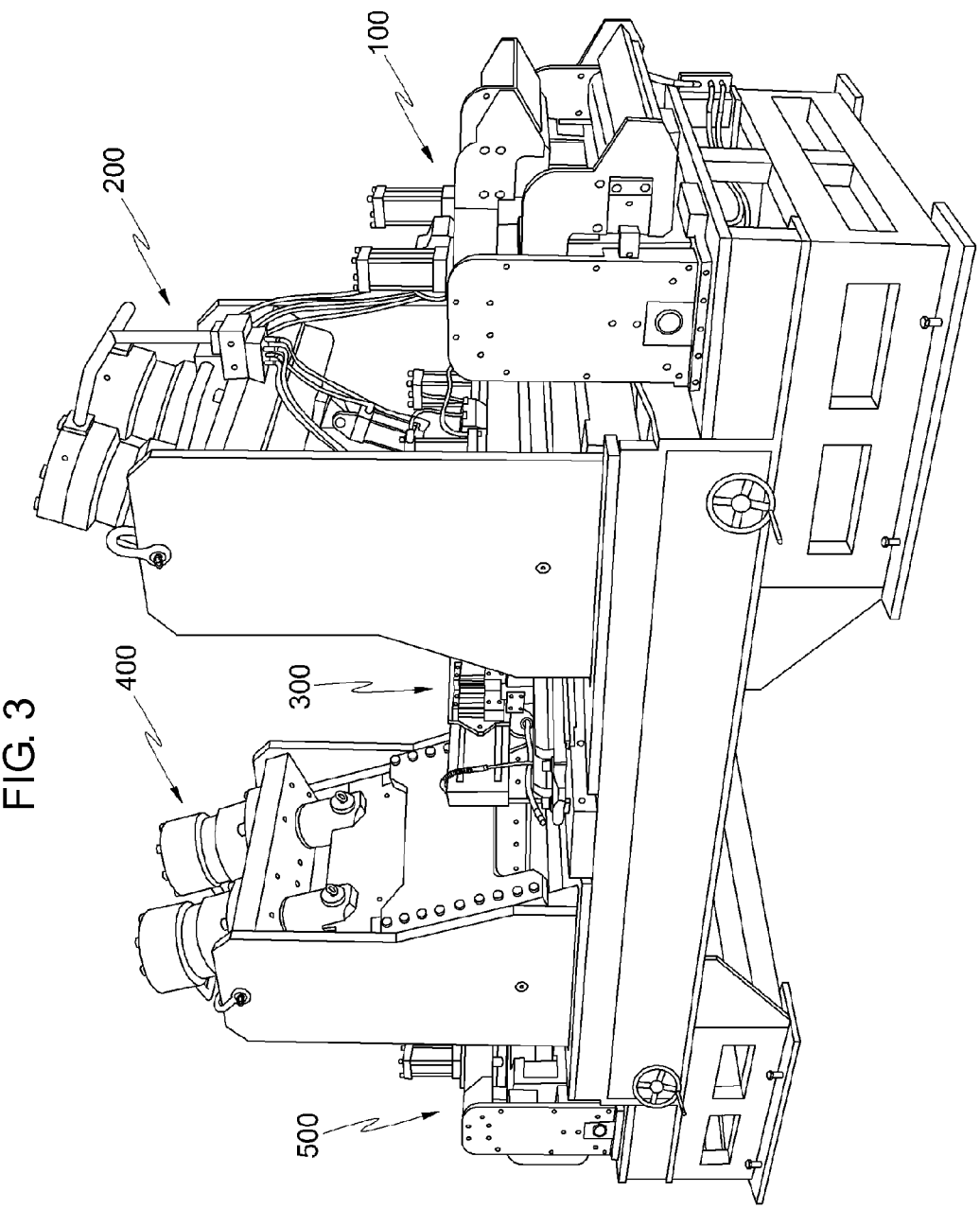

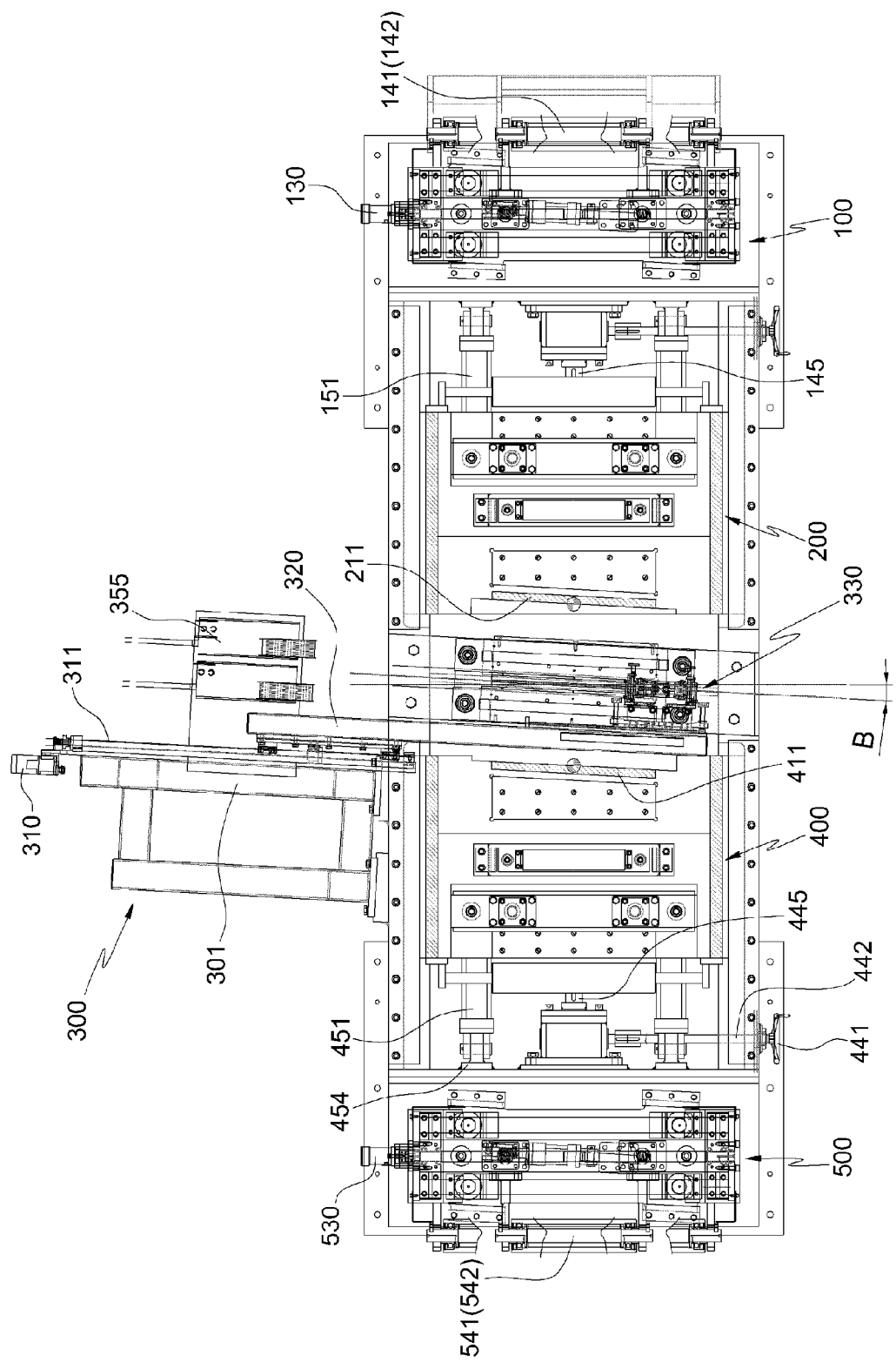

STRIP JOINING APPARATUS FOR PIPE MILL EQUIPMENT

BACKGROUND OF THE INVENTION

1. Field of the Invention

The present invention relates generally to a strip joining apparatus for metal pipe mill equipment which cuts a trailing end of a preceding steel strip and a leading end of a following steel strip that are to be supplied to a looper of the pipe mill equipment, and puts the cut surfaces of the two steel strips into contact with each other, and then welds them to each other, thus joining the two steel strips and, more particularly, to a strip joining apparatus which can effectively weld and join comparatively thick strips having thicknesses ranging from 15 mm to 25 mm to each other.

2. Description of the Related Art

Generally, a steel strip used to produce a metal pipe is supplied to a looper in such a way that a roll formed by winding a strip by a predetermined length (from 50 M to 100 M) is mounted on an uncoiler, and the strip is supplied from the uncoiler to the looper. The steel strip is thereafter transferred from the looper to a pipe producing machine, that is, a pipe mill, for producing a metal pipe.

The looper rotates and winds the steel strip around it, thus storing a predetermined length of steel strip, and simultaneously supplies the steel strip that has been stored to the pipe mill. As such, the looper stores a predetermined amount of steel strip and supplies the steel strip to the pipe mill. Such loopers are classified into a vertical type looper and a rotary type looper that is an improvement of the vertical type looper. The detailed construction and function of loopers are well known.

Typically, a steel strip must be continuously supplied to a pipe mill process. Thus, if after a steel strip roll has been completely uncoiled, another steel strip roll is mounted on the uncoiler and supplied to the pipe mill.

Here, a trailing end of the steel strip that has been completely uncoiled must be welded to a leading end of the steel strip that has been newly mounted on the uncoiler, thus joining them to each other, thereby forming a continuous steel strip. During this joining operation, the transfer of the steel strip is interrupted, but the steel strip that has been stored in the looper is supplied to the pipe mill to prevent the joining operation from interrupting the pipe mill.

In the conventional art, the welding operation has been typically carried out using a manual method. However, in this case, the welding operation cannot be rapidly carried out. If the operation of joining the steel strips to each other is not finished before the steel strip that has been stored in the looper is completely exhausted, this results in the problem of the entire pipe mill being interrupted.

To solve the above problem that the manual work causes, there is conventionally available a welding device (Apparatus for cutting and welding strips) as disclosed in Korean Patent Registration No. 10-649652 (registered on Nov. 17, 2006), wherein a trailing end of a preceding steel strip and a leading end of a following steel strip that is supplied to a looper are cut, and then the cut surfaces of the two steel strips are put into contact with each other and are welded to each other (hereinafter, referred to as the 'conventional technique'). As shown in the front view of FIG. 1A and the plan view of FIG. 1B, the conventional technique includes clamp units 20 and 22 which respectively press adjacent ends of steel strips 10 and 11 and clamp them, a cutting unit 30 which cuts the steel strips 10 and 11, a transfer unit 40 which transfers the clamp units 20 and 22 so that the cut surfaces of the two steel strips 10 and 11 are put into contact with each other, and a welding unit 50 which welds the steel strips 10 and 11 to each other. The terms of the elements designated by reference numerals of FIGS. 1A and 1B are the same as those stated in the patent gazette of the conventional technique.

The conventional technique having the above-mentioned construction is a strip joining apparatus which can be used to cut comparatively thin steel strips and weld them to each other, but it is not suitable for being used to join together thick steel strips which range in thickness from 15 mm to 25 mm.

In detail, in the strip joining apparatus according to the conventional technique, a cutting blade of the cutting unit 30 moves downwards perpendicular to a steel strip, thus cutting the steel strip. Hence, as shown in FIG. 2A, the cut surface of each of two steel strips runs vertically. If the vertical cut surfaces of the two steel strips are put into contact with each other and are welded to each other, the maximum thickness of the steel strips which can be welded and joined to each other without creating any problems ranges from about 10 mm to about 12 mm.

However, in the case of comparatively thick strips, if the cut surfaces of the strips are vertical surfaces, as shown in FIG. 2B, only upper portions of the two cut surfaces of a preceding strip and a following strip are welded to each other, while the space between their lower portions is not filled with deposit metal, because a portion between the two cut surfaces that requires welding is comparatively deep.

Particularly, if the quality of welding of the joined portion between the steel strips is low, during a process of twisting the steel strips in the looper or of transferring it to pipe mill equipment, there is the possibility that the steel strip will be cut on the joined portion, or that the manufactured metal pipe will be defective. To mitigate the above problems, a worker may separately manually weld the lower portions of the steel strips. However, the manual work makes it difficult for the quality of welding to be uniform and is time-consuming.

In an effort to overcome the problems of the conventional technique, especially, to enhance the quality of welding of thick strips, a process of cutting steel strips and welding the strips to each other before the joined strip is supplied to the pipe mill equipment may be conducted using the method of: trimming the cut surfaces of the preceding steel strip and the following steel strip using a milling cutter or the like so that the cut surfaces of the two steel strips that are put into contact with each other define a 'V'-shaped groove, as shown in FIG. 2C; and welding the cut surfaces along the 'V'-shaped groove.

However, given the characteristic of the pipe mill that the process of cutting the steel strips and welding them to each other must be completed within a time period of from 8 minutes to 15 minutes, the trimming of the vertical cut surfaces of the thick strips using a cutting tool, to form a 'V'-shaped welding groove, makes the strip joining work take a lot of time, although it can enhance the quality of welding at the junction between the thick strips. If the storage capacity of a looper for a steel strip is not large enough, the strip joining work may be pressed for time, because it must be finished within a relatively short time (before an extra steel strip that has been stored in the looper is completely exhausted).

Particularly, the pipe mill equipment forms a pipe while a steel strip is being supplied thereto at high speed of about 50 m per a minute. Given that the strip joining work must be finished before the extra steel strip that has been stored in the looper is completely exhausted, an improved strip joining apparatus which can effectively conduct the process of cutting thick steel strips and welding them to each other in a comparatively short time is required.

SUMMARY OF THE INVENTION

Accordingly, the present invention has been made keeping in mind the above problems occurring in the prior art, and an object of the present invention is to provide a strip joining apparatus for pipe mill equipment which cuts a trailing end of a preceding steel strip and a leading end of a following steel strip, and puts the cut surfaces of the two steel strips into contact with each other, and then welds them to each other, thus joining the two steel strips to each other and, particularly, is able to rapidly cut thick steel strips and weld them to each other despite ensuring the improved quality of the welded portion.

In order to accomplish the above object, the present invention provides a strip joining apparatus for pipe mill equipment, including: a first cutting unit cutting a trailing end of a preceding steel strip, the first cutting unit comprising: a vertical clamp vertically pressing and clamping the trailing end of the preceding steel strip; and a first upper blade moving upwards and downwards, thus cutting the preceding steel strip; a second cutting unit cutting a leading end of a following steel strip, the second cutting unit comprising a vertical clamp vertically pressing and clamping the leading end of the following steel strip; and a second upper blade moving upwards and downwards, thus cutting the following steel strip; a first transfer means for transferring the first cutting unit forwards or backwards with respect to a direction in which the preceding steel strip is transferred; a second transfer means for transferring the second cutting unit forwards or backwards with respect to a direction in which the following steel strip is transferred; and a welding unit disposed between the first cutting unit and the second cutting unit, the welding unit welding cut surfaces of the preceding and following steel strips that have been moved next to each other by the first transfer means and the second transfer means and put into contact with each other, thus joining the cut surfaces of the preceding and following steel strips to each other. The first upper blade and the second upper blade are inclined downwards and face each other.

The first cutting unit may include a first inclined clamp disposed behind the first upper blade and inclined in a direction parallel to a direction in which the first upper blade moves to cut the preceding steel strip. The first inclined clamp may press and clamp the trailing end of the preceding steel strip.

The second cutting unit may include a second inclined clamp disposed behind the second upper blade and inclined in a direction parallel to a direction in which the second upper blade moves to cut the following steel strip. The second inclined clamp may press and clamp the leading end of the following steel strip.

As described above, the first and second upper blades that are inclined downwards and face each other cut the two steel strips so that when the steel strips are put into contact with each other at the center of the welding unit, the cut surfaces of the steel strips form a 'V' shape. In this state, the cut surfaces of the two steel strips are welded to each other. Therefore, the present invention can weld the thick strips to each other after only a single cutting process without requiring additional work of trimming the cut surfaces of the ends of the thick strips. In addition, the present invention can improve the quality of the welded junction between the two strips.

BRIEF DESCRIPTION OF THE DRAWINGS

The above and other objects, features and advantages of the present invention will be more clearly understood from the following detailed description taken in conjunction with the accompanying drawings, in which:

FIG. 3 is a perspective view illustrating the general shape of a strip joining apparatus, according to the present invention;

FIG. 5 is a plan view of FIG. 4;

FIGS. 6A through 6C illustrate a first cutting unit according to the present invention, wherein FIG. 6A is an enlarged view of the first cutting unit shown in FIG. 4, FIG. 6B is a right side view of FIG. 6A, and FIG. 6C is a sectional view taken along line A-A of FIG. 6A;

FIGS. 7A and 7B illustrate an inlet-side guide unit which controls the direction, in which a steel strip that is being drawn into is transferred, and clamps the steel strip in a stop state, wherein FIG. 7A is a right side view of the inlet-side guide unit of FIG. 4, and FIG. 7B is a sectional view taken along line B-B of FIG. 7A;

FIGS. 8A and 8B illustrate the outlet-side guide unit which controls the direction in which a steel strip that is being discharged is transferred, and clamps the steel strip in a stop state, wherein FIG. 8A is a right side view of the outlet-side guide unit of FIG. 4, and FIG. 8B is a sectional view taken along line C-C of FIG. 8A;

FIGS. 9A and 9B illustrate a welding unit according to the present invention, wherein FIG. 9A is a right side view of the welding unit, and FIG. 9B illustrates a pair of welding clamps which are disposed in a lower portion of the welding unit and respectively clamp the two steel strips to be welded;

FIGS. 11A through 12D are views successively illustrating the process of joining the trailing end of the preceding steel strip to the leading end of the following steel strip using the strip joining apparatus according to the present invention, wherein FIG. 11A illustrates the operation in which after the trailing end of the preceding steel strip has passed through a first welding clamp, a clamp of the outlet-side guide unit and a vertical clamp of the first cutting unit move downwards, clamping the preceding steel strip, FIG. 12D illustrates the operation of transferring the leading end of the following steel strip to the welding position using the second cutting unit.

DESCRIPTION OF THE PREFERRED EMBODIMENTS

Hereinafter, a strip joining apparatus for pipe mill equipment according to a preferred embodiment of the present invention will be described in detail with reference to the attached drawings.

The strip joining apparatus according to the present invention is an apparatus which is disposed between an uncoiler and a looper and joins two steel strips to each other by a process of: cutting at an angle a trailing end of the preceding steel strip and a leading end of the following steel strip; moving the cut surfaces of the two steel strips to a central portion of a welding unit 300; and welding the cut surfaces that have been put into contact with each other.

Figure 4:
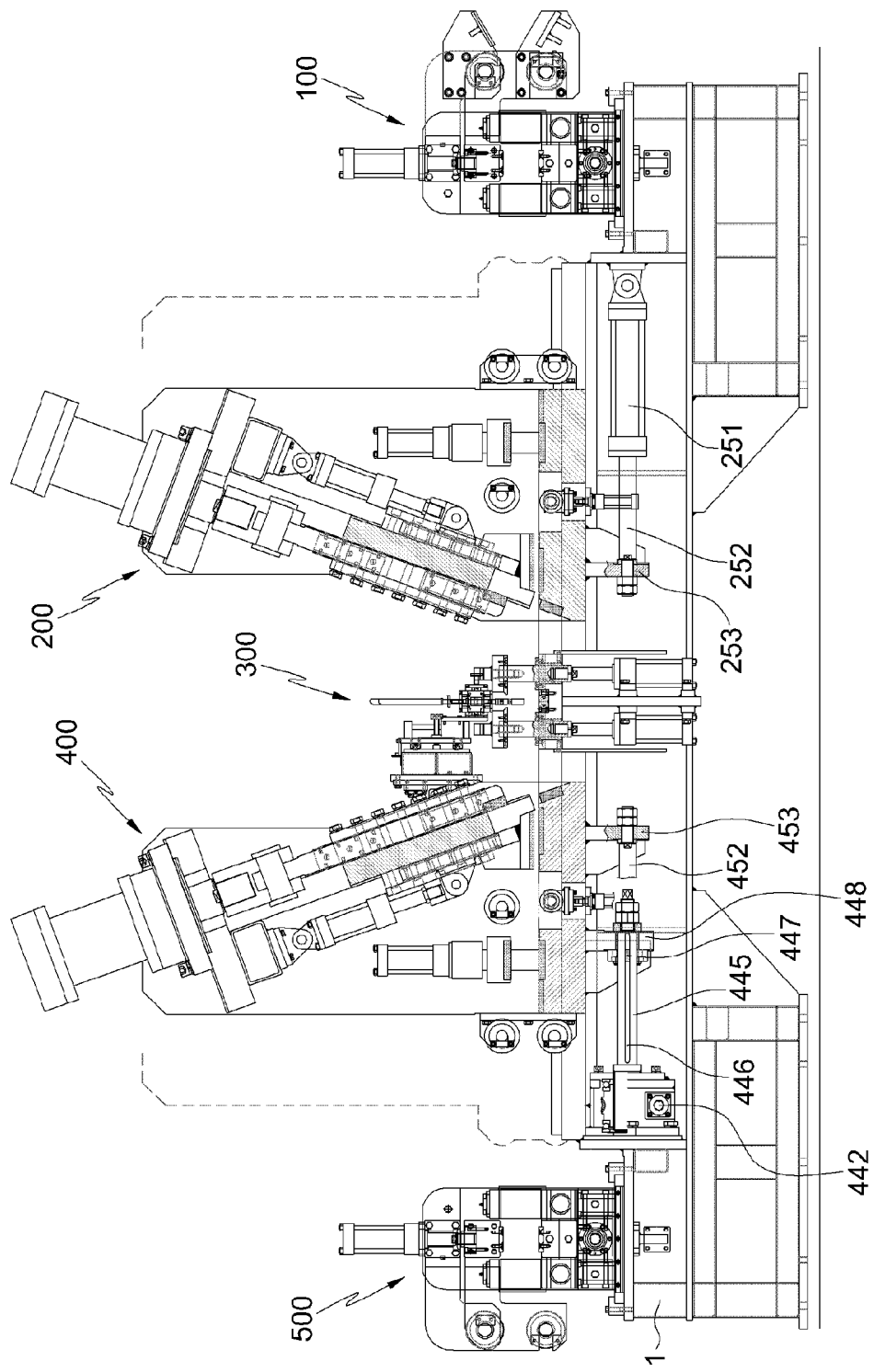
FIG. 4 is a front sectional view showing the general shape of the strip joining apparatus according to the present invention.

FIG. 3 is a perspective view showing the general shape of the strip joining apparatus according to the present invention. FIG. 4 is a front sectional view showing the general shape of the strip joining apparatus according to the present invention. FIG. 5 is a plan view of FIG. 4, from which the first cutting unit 400 and the second cutting unit 200 have been removed.

As shown in FIGS. 3 and 4, the strip joining apparatus includes a first cutting unit 400, a first-cutting-unit-transfer means (hereinafter, referred to as a 'first transfer means'), a second-cutting-unit-transfer means (hereinafter, referred to as a 'second transfer means') and a welding unit 300.

Figure 6A:
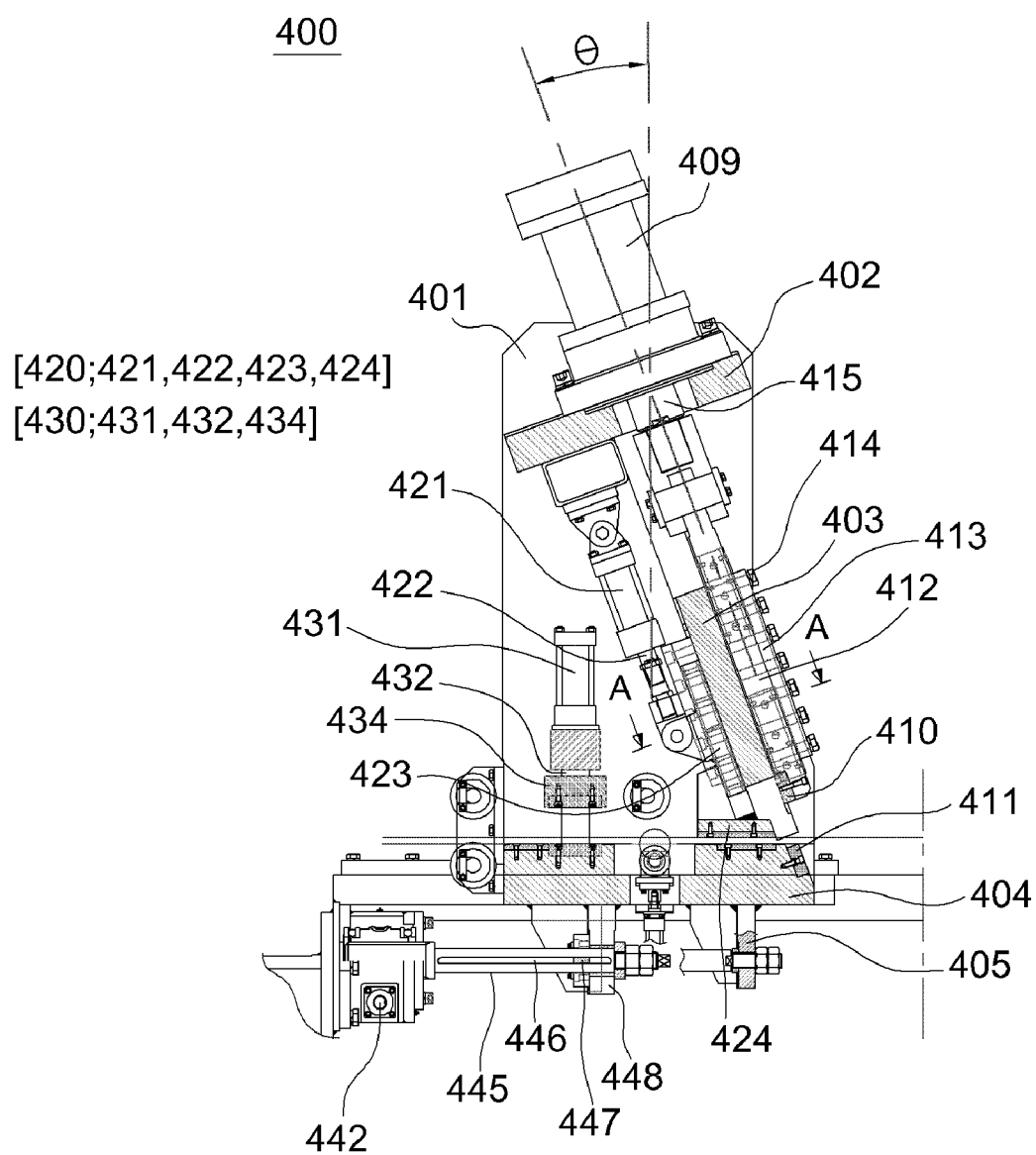
Figure 6B:
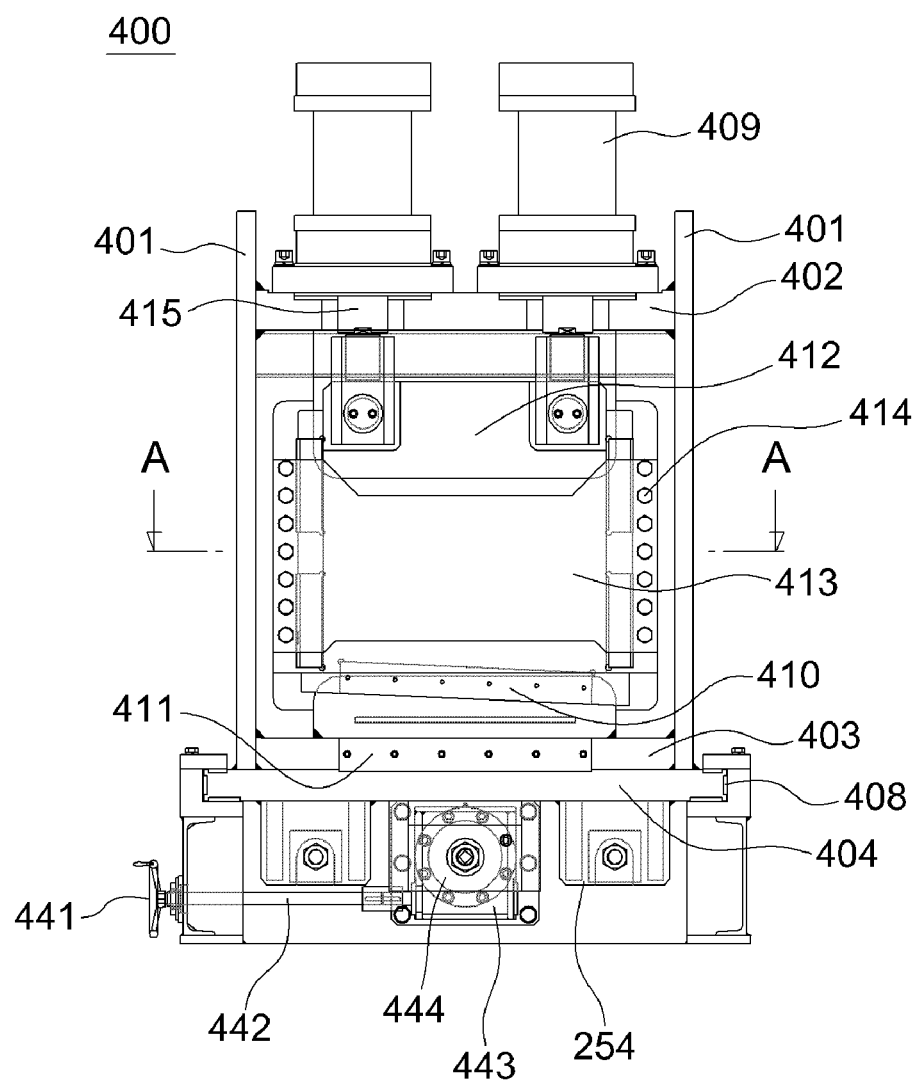
Figure 6C:
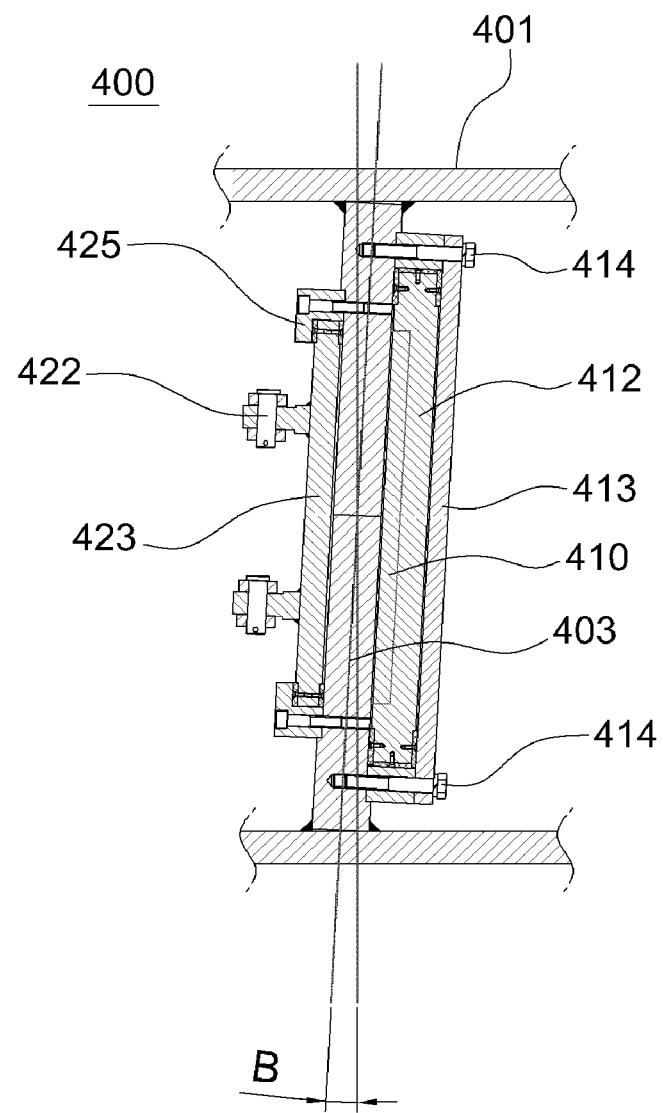

FIGS. 6A through 6C illustrate the first cutting unit 400 according to the present invention, wherein FIG. 6A is an enlarged view of only the first cutting unit 400 shown in FIG. 4, FIG. 6B is a right side view of FIG. 6A, and FIG. 6C is a sectional view taken along line A-A of FIG. 6A;

As shown in FIG. 6A, the first cutting unit 400 cuts the trailing end of the preceding steel strip 10 and includes a vertical clamp 430 which vertically presses the trailing end of the preceding steel strip 10 and clamps it, and a first upper blade 410 which moves upwards and downwards to cut the preceding steel strip 10.

The construction and operation of the second cutting unit 200 are the same as those of the first cutting unit 400, therefore detailed description will be omitted.

Furthermore, only 100-digit numbers of reference numerals of the elements of the second cutting unit 200 are different from those of the elements of the first cutting unit 400, and the same 10- and single-digit numbers are used to designate the same or corresponding elements between the first and second cutting units 400 and 200.

The second cutting unit 200 cuts the leading end of the following steel strip 11 and includes a vertical clamp 230 which vertically presses the leading end of the following steel strip 11 and clamps it, and a second upper blade 210 which moves upwards and downwards to cut the following steel strip 11.

The first transfer means moves the first cutting unit 400 forwards and backwards with respect to the direction in which the strip is transferred.

The second transfer means moves the second cutting unit 200 forwards and backwards with respect to the direction in which the strip is transferred.

The welding unit 300 is disposed between the first cutting unit 400 and the second cutting unit 200 and welds the cut surfaces of the two steel strips that have been moved next to each other by the first and second transfer means and put into contact with each other, thus joining the cut surfaces to each other.

Figure 1A:
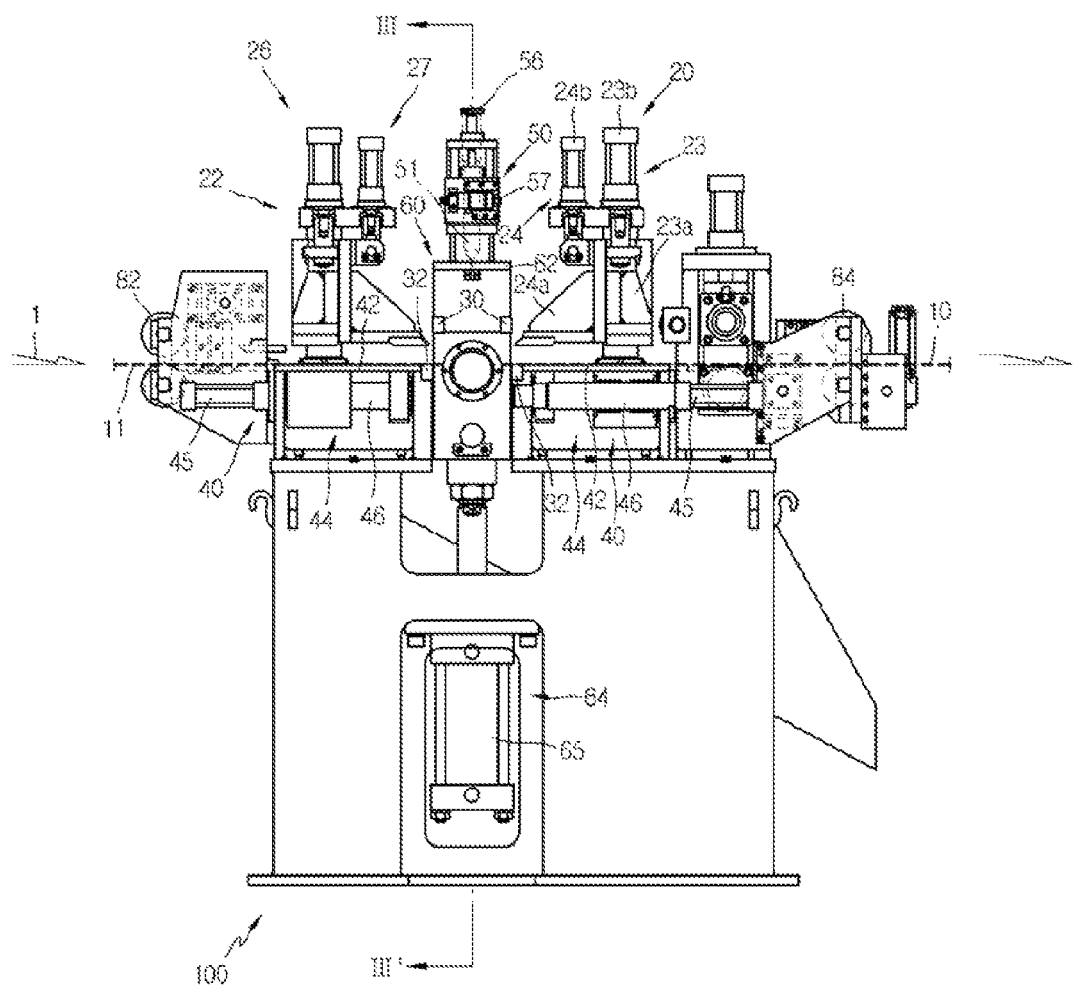
FIGS. 1A and 1B are schematic views showing the construction of a strip cutting apparatus according to the conventional technique.
Figure 1B:
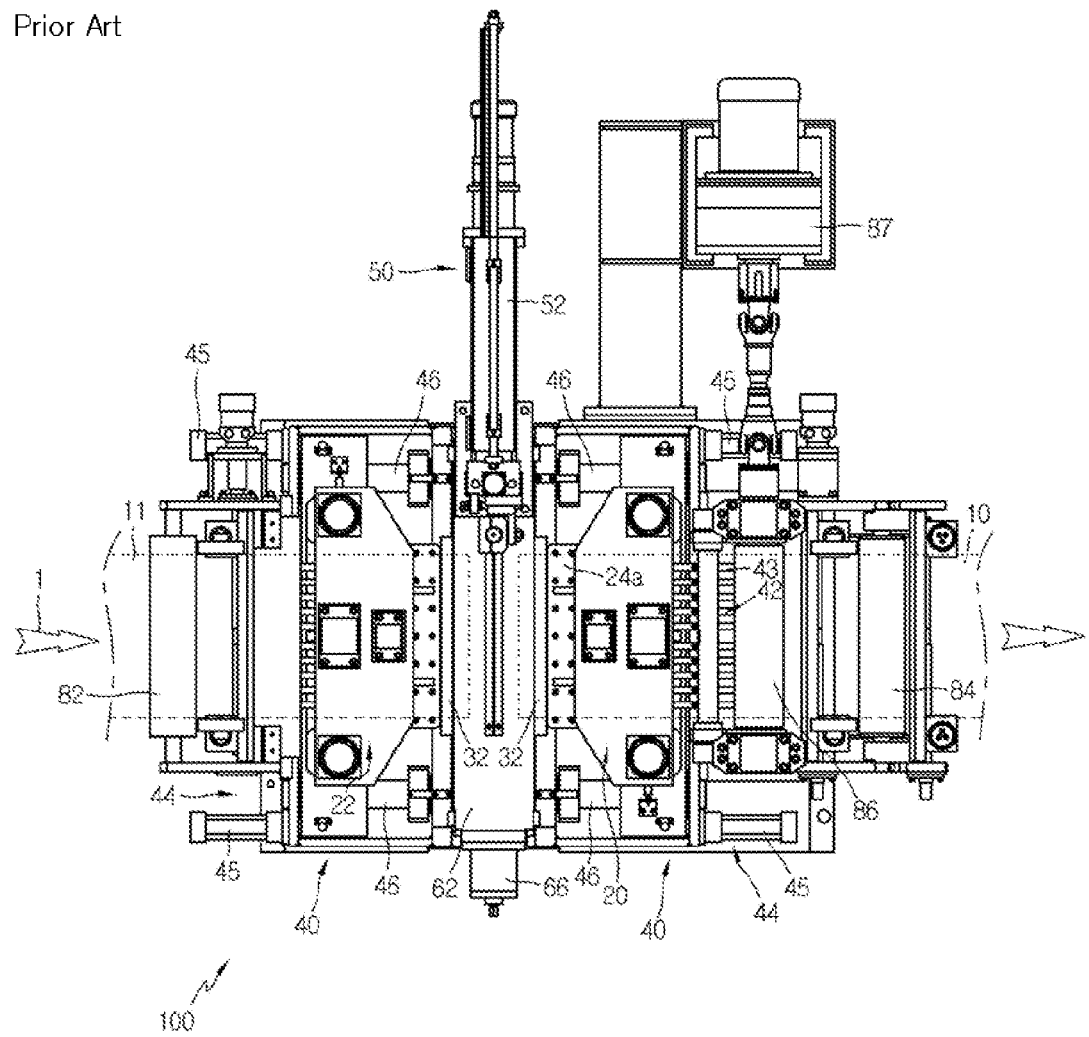
Figure 2A:
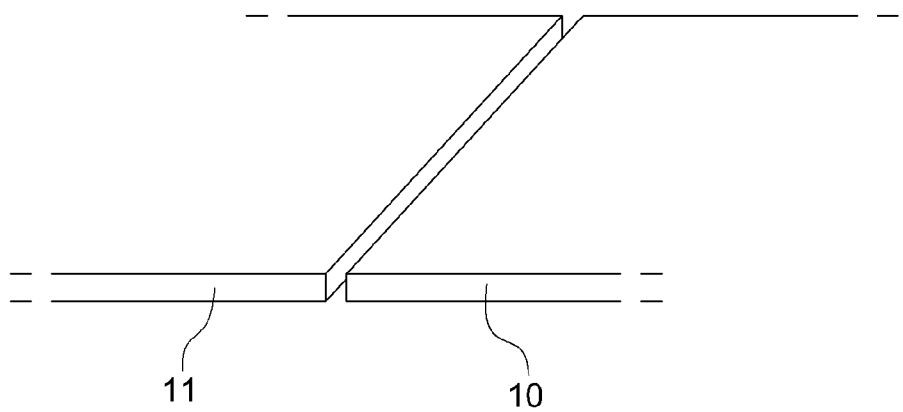
FIGS. 2A through 2C illustrate the shapes of a cut surface of a trailing end of a preceding steel strip and a cut surface of a leading end of a following steel strip and the state of welding at the junction between the cut surfaces.
Figure 2B:
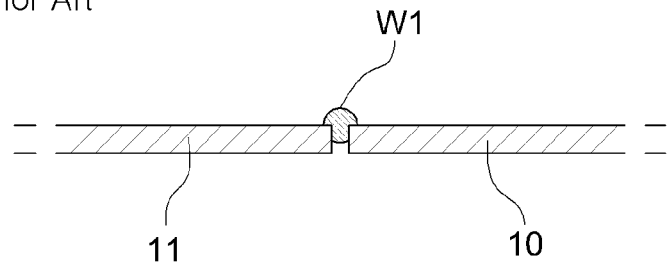
Figure 2C:
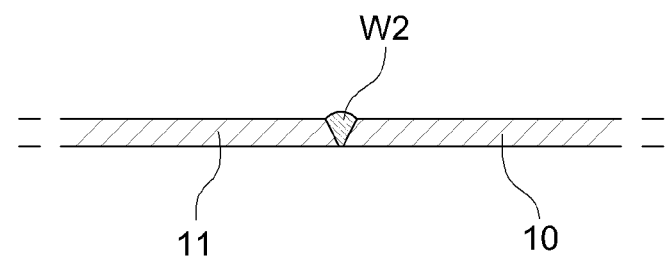

The first upper blade 410 and the second upper blade 210 are inclined downwards and face each other. Thus, the ends of the two steel strips 10 and 11, which are respectively cut by the first and second upper blades 410 and 210, define a 'V'-shaped groove, as shown in FIG. 2C. In this state, the cut ends of the two steel strips 10 and 11 that are put in close contact with each other are welded together, so that the quality of welding of the junction between the thick strips can be enhanced.

Furthermore, to enhance the precision of the work of cutting the thick steel strips in such a way that the cut surfaces of the strips are inclined, the first cutting unit 400 further includes an inclined clamp 420 which is disposed behind the first upper blade 410 and inclined in a direction parallel to the direction in which the first upper blade 410 moves to cut the preceding steel strip. The inclined clamp 420 presses the trailing end of the preceding steel strip and clamps the trailing end. The second cutting unit 200 further includes an inclined clamp 220 which is disposed behind the second upper blade 210 and oriented in a direction parallel to the direction in which the second upper blade 210 moves to cut the following steel strip. The inclined clamp 220 presses the leading end of the following steel strip and clamps the leading end.

As shown in FIGS. 3 through 5, the strip joining apparatus according to the present invention further includes an inlet-side guide unit 100 which is disposed around an inlet through which a steel strip that has been uncoiled from the uncoiler (not shown) enters the strip joining apparatus. The inlet-side guide unit 100 controls the direction in which the steel strip that is entering the strip joining apparatus is transferred. When necessary, the inlet-side guide unit 100 clamps the steel strip that is being transferred, thus stopping it. The strip joining apparatus further includes an outlet-side guide unit 500 which controls the direction of transfer of the steel strip that is being discharged towards the looper after having passed through the strip joining apparatus. When required, the outlet-side guide unit 500 clamps the steel strip that is being transferred, thus stopping it.

First, the structure of the first cutting unit 400 and the second cutting unit 200 according to the present invention will be explained.

Each of the first and second cutting units 400 and 200 has a transfer passage along which the steel strip is transferred. Based on the welding unit 300 which is disposed on the medial portion of the apparatus, the first and second cutting units 400 and 200 are symmetrically provided on front and rear sides with respect to the direction in which the steel strip is transferred. The first and second cutting units 400 and 200 have the same structure although their orientations are opposite. Hence, the construction of the first cutting unit 400 will be explained in detail with reference to FIGS. 6A through 6C.

As shown in FIGS. 6A through 6C, in the first cutting unit 400 according to the present invention, an upper horizontal frame 402 and a lower horizontal frame 403 are horizontally fixed between a pair of vertical supports 401. A cutting-related hydraulic cylinder 409, which moves the upper blade 410 upwards and downwards, is fixed to the upper horizontal frame 402.

The first cutting unit 400 is characterized in that the front edge of the upper blade moves upwards and downwards in a direction inclined towards the welding unit 300 by a predetermined angle θ. To achieve this purpose, the upper horizontal frame 402 is fixed to the vertical supports 401 such that the right side thereof based on FIG. 6A is inclined upwards by the angle θ. The cutting-related hydraulic cylinder 409 is perpendicularly installed on the inclined upper horizontal frame 402.

The lower horizontal frame 403 is fixed to the vertical support 401 and inclined by the angle θ such that it is oriented in the same direction as the direction in which the cutting-related hydraulic cylinder 409 operates. The vertical movement of a holder 412 which supports the upper blade 410 can be guided along the inclined surface of the lower horizontal frame 403.

The holder 412 is guided between the lower horizontal frame 403 and the cover 413 such that it moves upwards and downwards. The upper end of the holder 412 is coupled to a piston rod 415 of the cutting-related hydraulic cylinder 409.

The lower blade 411 that corresponds to the upper blade 410 is fixed to the upper surface of a base frame 404. Here, the lower blade 411 is inclined by the angle θ corresponding to the direction in which the upper blade 410 moves upwards and downwards.

In FIGS. 6A through 6C, reference numeral 414 denotes a fastening bolt which fastens the cover 413 to the lower horizontal frame 403. The holder 412 that supports the upper blade 410 moves in the inclined direction upwards and downwards between the cover 413 and the lower horizontal frame 403. As can be understood from the A-A sectional view shown FIG. 6C, it is preferable that a transfer guide be provided on each of the opposite ends of the holder 412 to minimize frictional resistance created as the holder 412 moves upwards and downwards.

As shown in FIG. 6A, the front edge of the upper blade 410 is inclined such that the height thereof increases from one side thereof to the other. Thus, when the upper blade 410 moves downwards and cuts the following strip, the cutting begins from one side edge of the following strip and progresses to the other side edge thereof. As such, because the front edge of the upper blade 410 is inclined, the load of cutting the following strip can be minimized.

More preferably, the strip joining apparatus according to the present invention cuts the steel strip at a predetermined angle B with respect to an imaginary reference line provided lateral to the steel strip. FIG. 6C illustrates that the upper blade 410 is oriented at the angle B with respect to the imaginary reference line provided lateral to the steel strip. As shown in FIG. 5, the lower blade 411 corresponding to the upper blade 410 is also oriented at the angle B. Further, the welding unit 300 is also oriented at the angle B, as shown in FIG. 5. The junction line between the cut surfaces of the two steel strips 10 and 11, in other words, the welding line is slanted because the welding unit must not be focused on a specific portion based on the longitudinal direction of the steel strips. That is, if the welding line between the two steel strips 10 and 11 is slanted at the predetermined angle B, during a subsequent process {in which a steel strip is stored in the looper and supplied into and formed by a roll forming apparatus (a pipe mill)}, problems of the steel strips rattling momentarily on a discontinuous surface of the welded portion of the steel strips, of the concentration of stress, and so on can be mitigated.

The upper blade 410 of the first cutting unit 400 having the above-mentioned construction moves downwards at an inclined angle and comes into contact with the lower blade 411, thus beginning cutting the steel strip from one side edge thereof to the other side edge. Here, because the shear force given by the upper blade 410 acts at a slant by the inclined angle θ, a force which pulls the steel strip that is being cut backwards (in the direction opposite to the direction in which the steel strip is transferred) is applied to the steel strip, so that there may be the problem of the cutting being rendered imprecise. To prevent the above problem, the first cutting unit 400 according to the present invention further includes an inclined clamp 420 which is disposed at a side opposite to the upper blade 410 based on the lower horizontal frame 403. The inclined clamp 420 clamps the preceding steel strip that is being cut, thus preventing the preceding steel strip from being pulled backwards.

The inclined clamp 420 includes an inclined cylinder 421, an inclined clamping plate 423 and an inclined clamping pad 424. The inclined cylinder 421 is fixed to the lower surface of the upper horizontal frame 402. The inclined clamping plate 423 is rotatably coupled to the end of a piston rod 422 of the inclined cylinder 421 by a hinge and is moved upwards or downwards along the rear surface of the lower horizontal frame 403 depending on the operation of the inclined cylinder 421. The inclined clamping pad 424 is provided on the inclined clamping plate 423 and is put into close contact with the upper surface of the preceding steel strip. In FIG. 6C, reference numeral 425 denotes a guide block which is provided on the rear surface of the lower horizontal frame 403 and guides the upward and downward movement of the inclined clamping plate 423.

Further, the present invention further includes the vertical clamp 430 in order to more reliably clamp the steel strip during the process of cutting the steel strip such that the cut surface is inclined by the predetermined inclined angle θ with respect to verticality. The vertical clamp 430 includes a vertical cylinder 431 which is fixed to the vertical support 401, and a vertical clamping pad 434 which is provided on the end of a piston rod 432 of the vertical cylinder 431 and is put into close contact with the upper surface of the steel strip.

The first cutting unit 400 having the above-mentioned construction can be transferred forwards or backwards by the first transfer means with respect to the direction in which the steel strip is being transferred. To achieve the above purpose, the first cutting unit 400 is provided on the base frame 404. The base frame 404 is movable forwards and backwards on the main frame 1 with respect to the direction in which the steel strip is transferred. FIG. 6B illustrates a guide 408 which guides the opposite ends of the base frame 404 when it moves forwards or backwards.

The first transfer means for transferring the first cutting unit 400 includes a bracket 405 which protrudes from the lower surface of the base frame 404, and a pair of transfer cylinders 451 which are fixed to the main frame 1 below the base frame 404. The transfer cylinders 451 respectively have piston rods, the ends of which are hinged to the bracket 405. As such, because the ends of the piston rods of the transfer cylinders 451 are coupled to the bracket 405 that protrudes from the lower surface of the base frame 404, the transfer cylinders 451 can move the entirety of the first cutting unit 400 along the guide 408 of the main frame 1 forwards or backwards with respect to the direction in which the steel strip is transferred.

To precisely control the position at which the transfer of the first cutting unit 400 is limited, the present invention further includes means for precisely adjusting the transfer limitation position (hereinafter, succinctly referred to as a limitation position adjusting means).

The limitation position adjusting means includes an adjustment handle 441, a handle shaft 442, a worm wheel 444, a transfer guide shaft 445 and a key 447. The handle shaft 442 transmits rotating force of the adjustment handle 441 to a worm 443 that is provided in a gear box. The worm wheel 444 is provided in the gear box and engages with the worm 443. One end of the transfer guide shaft 445 is threadedly coupled to the worm wheel 444, and the other end thereof is received in a guide block 448 that protrudes from the lower surface of the base frame 404. A slot 446 is longitudinally formed in the transfer guide shaft 445. The key 447 is installed on the guide block 448 and received in the slot 446 of the transfer guide shaft 445. The key 447 moves along the slot 446.

The operation of the limitation position adjusting means having the above-mentioned construction will be explained. When rotation of the adjustment handle 441 rotates the worm 443, the worm wheel 444 is rotated, thus extracting the transfer guide shaft 445. Here, because the key 447 that is provided on the guide block 448 of the base frame 404 is disposed in the slot 446 of the transfer guide shaft 445, the distance that the base frame 404 is transferred is limited to within a range defined by the slot 446 of the transfer guide shaft 445. Therefore, by finely extracting the transfer guide shaft 445 as stated above, the limitation by which the base frame 404 can be moved along the guide 408 of the main frame 1 by the operation of the transfer cylinders 451 can be finely adjusted.

The first cutting unit 400 having the above-described construction can cut the steel strip in such a way that the cut surface of the steel strip is inclined by the predetermined angle θ with respect to the vertical line. After the preceding steel strip has been cut, the transfer cylinders 451 moves the first cutting unit 400 forwards in the direction in which the steel strip is transferred. Thereafter, the preceding steel strip is clamped and transferred backwards so that the cut trailing end of the preceding steel strip can be placed at the welding position of the welding unit 300.

The second cutting unit 200 according to the present invention functions to cut the leading end of the following steel strip 11. The second cutting unit 200 includes a vertical clamp 230 which vertically presses the leading end of the following steel strip 11 and clamps it, and a second upper blade 210 which moves upwards and downwards and cuts the following steel strip 11. The second cutting unit 200 further includes an inclined clamp 220 which is disposed at a side opposite to the upper blade 210 based on the lower horizontal frame 203. The inclined clamp 220 clamps the following steel strip that is being cut, thus preventing the following steel strip from being pulled forwards.

The second cutting unit 200 having the above-mentioned construction can be transferred forwards or backwards by the second transfer means with respect to the direction in which the steel strip is transferred. To precisely control the position at which the transfer of the second cutting unit 200 is limited, the second transfer means of the present invention further includes a limitation position adjusting means.

Figure 7A:
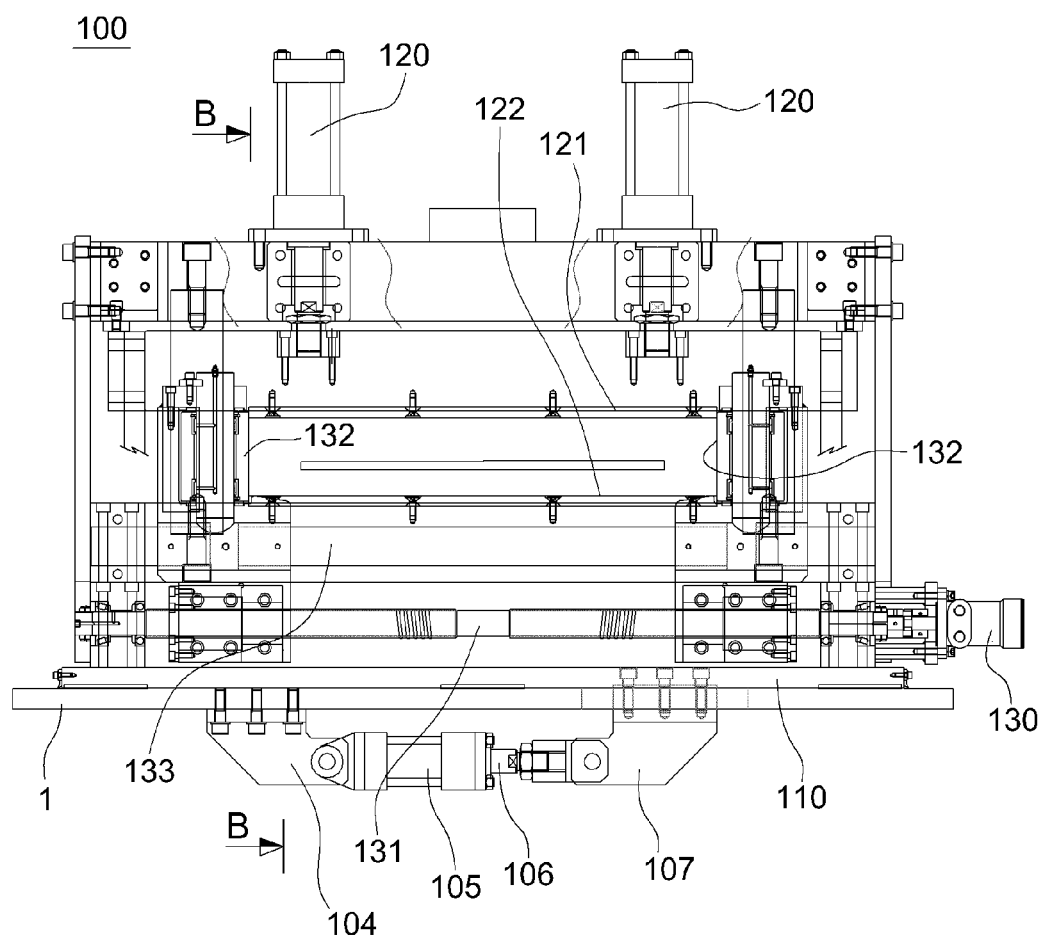
Figure 7B:
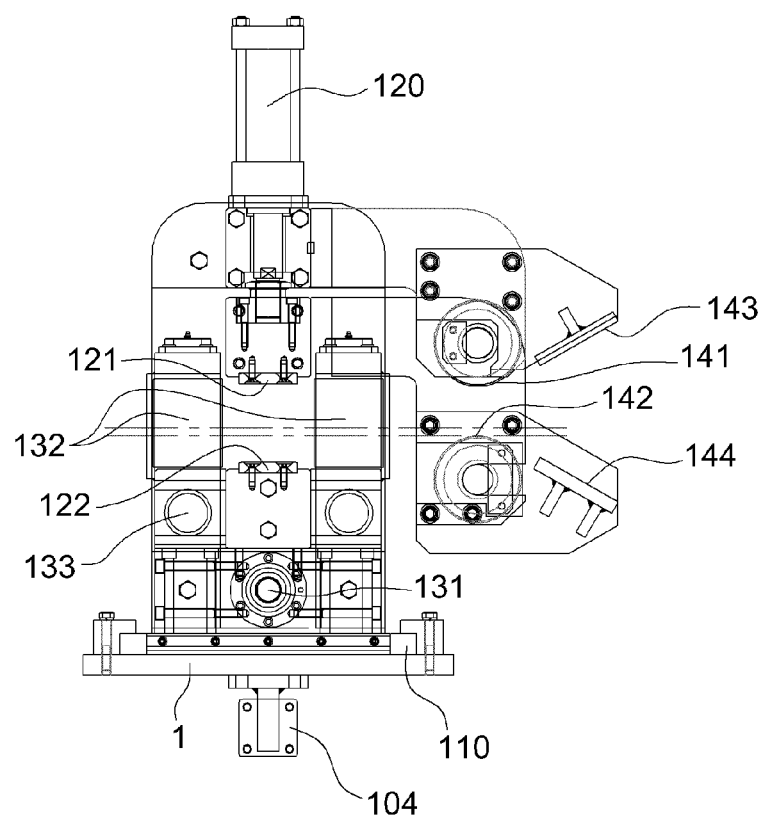

FIGS. 7A and 7B illustrate the inlet-side guide unit 100 which guides the steel strip uncoiled from the uncoiler to the second cutting unit 200. The inlet-side guide unit 100 functions to control the direction in which the steel strip that is being drawn towards the second cutting unit 200 is transferred (in other words, centering the steel strip) and clamp the steel strip when it is stopping during the cutting or welding operation. FIG. 7A is a right side view of the inlet-side guide unit 100 of FIG. 4. FIG. 7B is a sectional view taken along line B-B of FIG. 7A.

As shown in FIGS. 7A and 7B, the inlet-side guide unit 100 includes a base table 110, an inlet-side clamp, a pair of side edge guides 132 and a lateral position adjustment unit. The base table 110 is provided on the upper surface of the main frame 1 and is configured such that the position thereof can be adjusted with respect to the lateral direction of the steel strip. The inlet-side clamp is provided on the upper surface of the base table 110 and clamps the upper and lower surfaces of the steel strip. The side edge guides 132 are disposed at positions corresponding to the respective opposite edges of the steel strip and guide the opposite edges of the steel strip. The distance between the side edge guides 132 can be adjusted depending on the width of the steel strip. The lateral position adjustment unit adjusts the position of the base table 110 with respect to the lateral direction of the steel strip.

The inlet-side clamp includes a clamping cylinder 120 which is vertically placed, an upper clamping pad 121 which is coupled to the lower end of a piston rod of the clamping cylinder 120, and a lower clamping pad 122 which matches with the upper clamping pad 121.

The present invention further includes an inlet width adjustment motor 130 which moves the side edge guides 132 in the lateral direction of the steel strip in opposite directions, in other words, towards or away from a center line going in the direction of transfer of the steel strip. A left-handed thread and a right-handed thread are formed on an output shaft 131 of the inlet width adjustment motor 130. The side edge guides 132 are threadedly coupled to the corresponding left-handed thread and right-handed thread. Thereby, the side edge guides 132 are moved towards or away from each other in the lateral direction of the steel strip by the rotation of the adjustment motor 130, so that the distance between the side edge guides 132 can be adjusted. Therefore, depending on the standards of the steel strip to be processed, the inlet-side guide unit 100 can be adjusted, thus ensuring workability with the steel strips. In FIG. 7A, reference numeral 133 denotes a guide rod which supports the side edge guides 132 and guide the lateral movement of the side edge guides 132.

In the lateral position adjustment unit that adjusts the lateral position of the inlet-side guide unit 100, a lateral position adjustment cylinder 105 is provided on a fixed bracket 104 of the main frame 1, and the end of a piston rod 106 of the lateral position adjustment cylinder 105 is hinged to the base table 110. In FIG. 7A, reference numeral 107 denotes a movable bracket which is coupled to the lower surface of the base table 110 and moves along with the base table 110 in the lateral direction. In the lateral position adjustment unit of the inlet-side guide unit 100 having the construction shown in FIG. 7A, when the lateral position adjustment cylinder 105 is operated, and the piston rod 106 is extended or withdrawn, the position of the base table 110 is adjusted with respect to the main frame 1 in the lateral direction of the steel strip. Thereby, the positions of the side edge guides 132 and the inlet-side clamp that is provided on the upper surface of the base table 110 can be adjusted with respect to the lateral direction of the steel strip.

In FIG. 7B, reference numerals 141 and 142 respectively denote an upper guide roller and a lower guide roller which guide the upper and lower surfaces of the steel strip that is entering the inlet-side guide unit 100. Reference numerals 143 and 144 respectively denote upper and lower guide plates which guide the steel strip into the space between the upper and lower guide rollers 141 and 142.

Figure 8A:
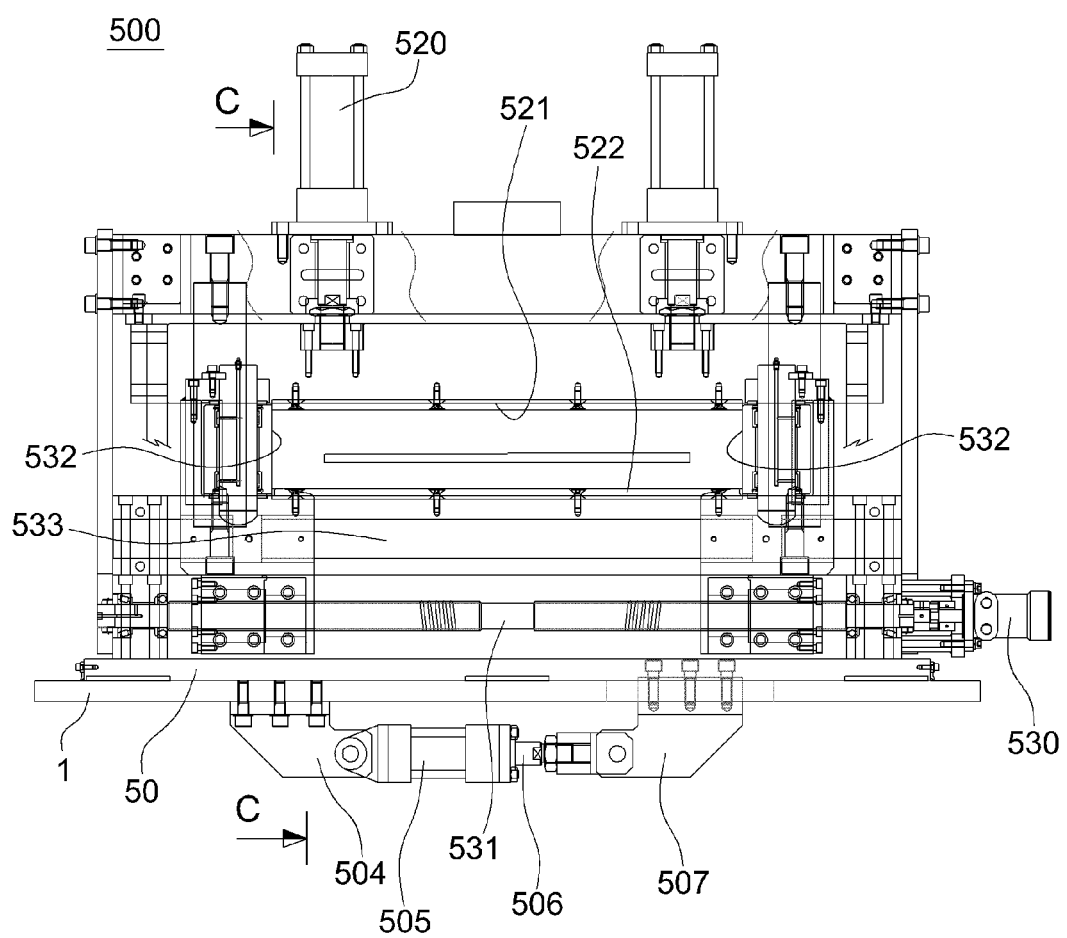
Figure 8B:
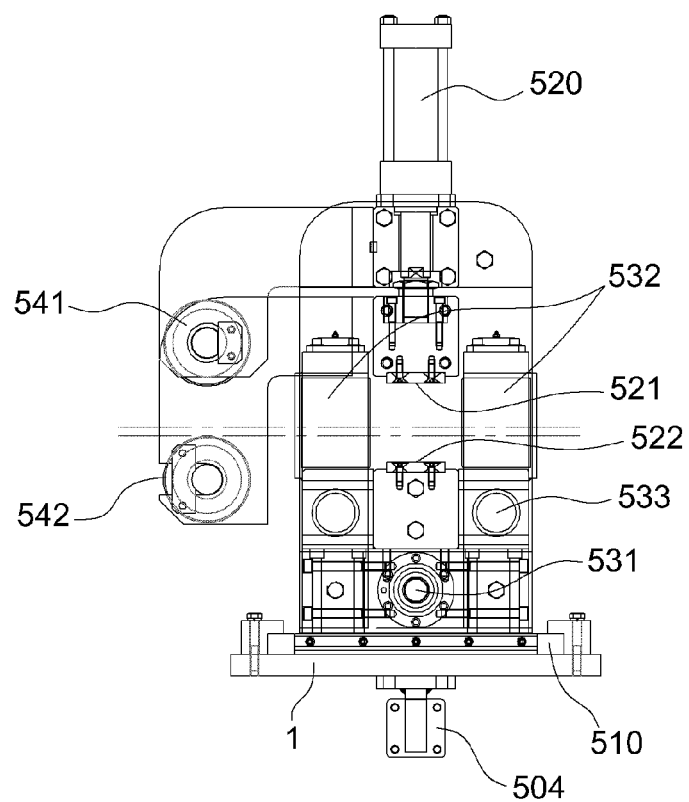

FIGS. 8A and 8B illustrate the outlet-side guide unit 500 which guides the steel strip that is being transferred to the looper after having passed through the first cutting unit. FIG. 8A is a right side view of the outlet-side guide unit 500 of FIG. 4, and FIG. 8B is a sectional view taken along line C-C of FIG. 8A.

As shown in FIGS. 8A and 8B, the outlet-side guide unit 500 according to the present invention includes a base table 510, an outlet-side clamp, a pair of side edge guide 532 and a lateral position adjustment unit. The base table 510 is provided on the upper surface of the main frame 1 and is configured such that the position thereof can be adjusted with respect to the lateral direction of the steel strip. The outlet-side clamp is provided on the upper surface of the base table 510 and clamps the upper and lower surfaces of the steel strip. The side edge guides 532 are disposed at positions corresponding to the respective opposite edges of the steel strip and guide the opposite edges of the steel strip. The distance between the side edge guides 532 can be adjusted with respect to the lateral direction of the steel strip depending on the width of the steel strip. The lateral position adjustment unit adjusts the position of the base table 510 with respect to the lateral direction of the steel strip.

The outlet-side clamp includes a clamping cylinder 520 which is vertically placed, an upper clamping pad 521 which is coupled to the lower end of a piston rod of the clamping cylinder 520, and a lower clamping pad 522 which matches with the upper clamping pad 521.

The present invention further includes an outlet width adjustment motor 530 which moves the side edge guide 532 with respect to the lateral direction of the steel strip in opposite directions, in other words, towards or away from a center line going in the direction of transfer of the steel strip. A left-handed thread and a right-handed thread are formed on an output shaft 531 of the outlet width adjustment motor 530. The side edge guides 532 are threadedly coupled to the corresponding left-handed and right-handed threads. Thereby, the side edge guides 532 are moved towards or away from each other by the rotation of the adjustment motor 530 with respect to the lateral direction of the steel strip, so that the distance between the side edge guides 532 can be adjusted. Therefore, depending on the standards of the steel strip to be processed, the outlet-side guide unit 500 can be adjusted, thus ensuring its compatibility with the steel strips. In FIG. 8A, reference numeral 533 denotes a guide rod which supports the side edge guides 532 and guide the lateral movement of the side edge guides 532.

In the lateral position adjustment unit that adjusts the lateral position of the outlet-side guide unit 500, a lateral position adjustment cylinder 505 is provided on a fixed bracket 104 of the main frame 1, and the end of a piston rod 506 of the lateral position adjustment cylinder 505 is hinged to the base table 110. In FIGS. 8A and 8B, reference numeral 507 denotes a movable bracket which is fixed to the lower surface of the base table 510 and moves along with the base table 510 in the lateral direction. In the lateral position adjustment unit of the outlet-side guide unit 500 having the construction shown in FIG. 8A, when the lateral position adjustment cylinder 505 is operated, extending or withdrawing the piston rod 506, the position of the base table 510 is adjusted with respect to the main frame 1 in the direction lateral to the steel strip. Thereby, the positions of the side edge guides 532 and the outlet-side clamp that is provided on the upper surface of the base table 510 can be adjusted with respect to the direction lateral to the steel strip.

In FIG. 8B, reference numerals 541 and 542 respectively denote an upper guide roller and a lower guide roller which guide the upper and lower surfaces of the steel strip that is entering the outlet-side guide unit 500.

Figure 9A:
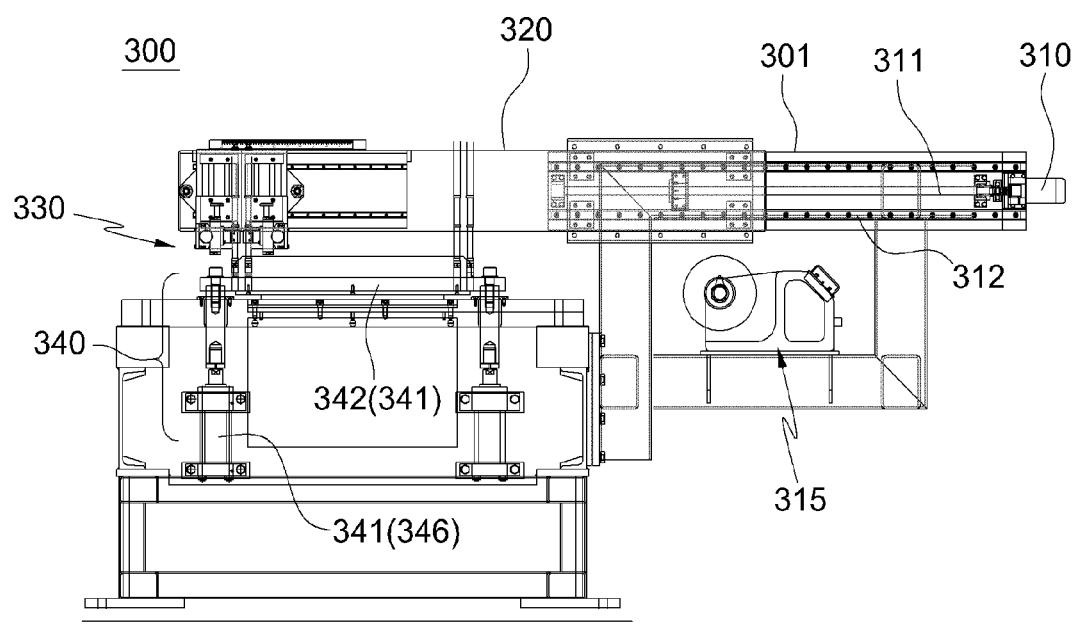
Figure 9B:
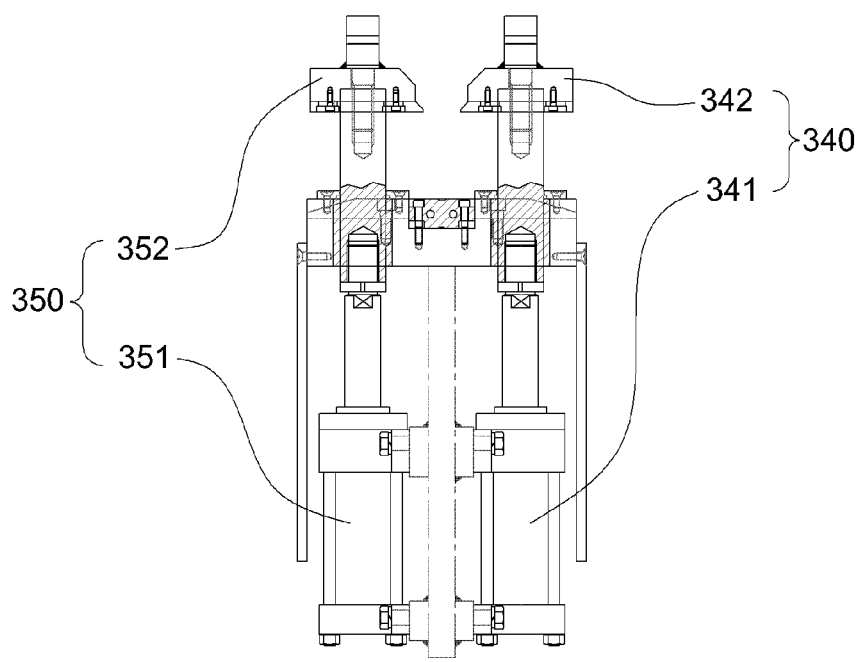

FIGS. 9A and 9B illustrate the welding unit 300 according to the present invention. FIG. 9A is a right side view of the welding unit 300. FIG. 9B illustrates a pair of welding clamps 340 and 350 which are disposed in a lower portion of the welding unit 300 and respectively clamp the two steel strips to be welded.

As shown in FIG. 9A, the welding unit 300 according to the present invention includes a welding unit frame 301, a ball screw 311, a drive motor 310, a rail bracket 320 and a welding module 330. The welding unit frame 301 is disposed above the steel strips and oriented in the same direction as the direction of the cutting lines of the steel strips. The ball screw 311 is supported by the welding unit frame 301. The drive motor 310 drives the ball screw. The rail bracket 320 is transferred along an LM guide 312 of the welding unit frame 301 in the direction of the cutting lines of the steel strips (that is, the direction in which the steel strips are being welded). The welding module 330 is fixed to one end of the rail bracket 320 and conducts the welding operation. The welding module 330 includes a welding torch adjustment means for adjusting the up-down and left-right positions of the welding torch. In FIG. 9A, reference numeral 315 denotes a welding wire supply device.

As shown in FIG. 9B, the welding unit 300 further includes the welding clamps 340 and 350 which are respectively disposed to the front and rear of the welding module 330 with respect to the direction in which the steel strips move when transferred. The welding clamps 340 and 350 respectively include drive cylinders 341 and 351 which are vertically provided under a welding table. The welding clamps 340 and 350 further respectively include clamping pads 342 and 352, which are provided above the steel strips and which clamp or release the steel strips depending to upward or downward movement of the piston rods of the drive cylinders 341 and 351. In FIG. 9B, the left welding clamp 350 refers to a first welding clamp, and the right welding clamp 340 refers to a second welding clamp.

Although not shown in the drawings, each of the first and second welding clamps 350 and 340 includes a sensor that senses the presence of a steel strip, so that each drive cylinder 341, 351 is operated depending on a signal from the corresponding sensor.

The operation of the strip joining apparatus according to the present invention having the above-mentioned construction will be described in detail with reference to the attached drawings.

Figure 10:
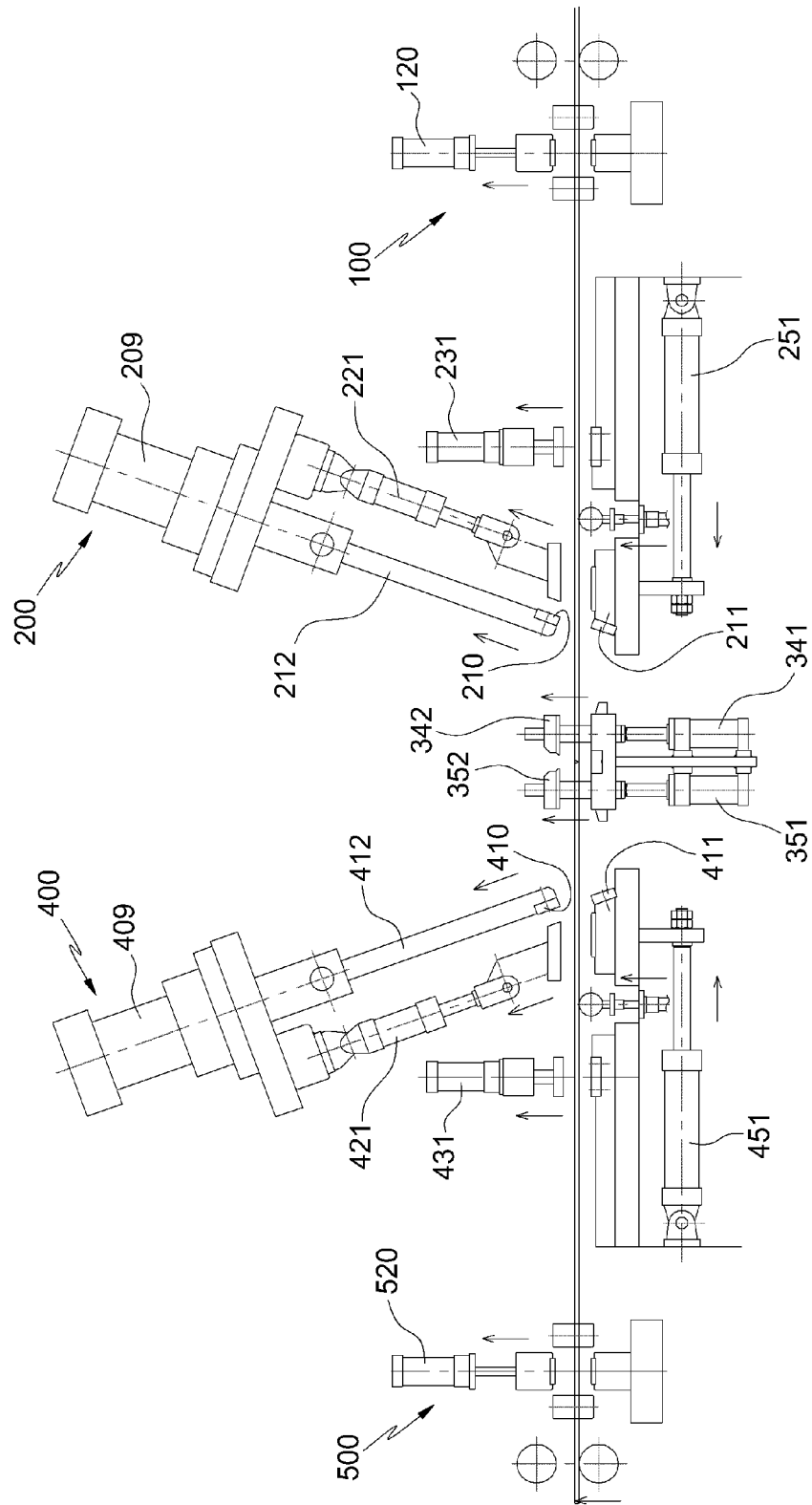
FIG. 10 is a view illustrating the basic positions of the elements of the strip joining apparatus when the steel strips are normally supplied to the pipe mill during a normal pipe mill process.

FIG. 10 is a view illustrating the basic positions of the elements of the strip joining apparatus when the steel strips are normally supplied to the pipe mill during a normal pipe mill process. When the steel strips are normally being transferred, the strip joining apparatus of the present invention does not participate in the transfer of the steel strips. In other words, all of the piston rods of the clamping cylinder 120 of the inlet-side guide unit 100, the cutting-related hydraulic cylinder 209, the inclined cylinder 221 and the vertical cylinder 231 of the second cutting unit 200, the drive cylinders 341 and 351 of the welding clamps 340 and 350, the cutting-related hydraulic cylinder 409, the inclined cylinder 421 and the vertical cylinder 431 of the first cutting unit 400, and the clamping cylinder 520 of the outlet-side guide unit 500 are maintained in the moved-up state, thus allowing the movement of the steel strips to be unrestricted.

FIGS. 11A to 12D are views successively illustrating the process of joining the trailing end of the preceding steel strip to the leading end of the following steel strip using the strip joining apparatus according to the present invention.

First, a process of cutting the trailing end of the preceding steel strip and transferring the trailing end of the preceding steel strip to the welding position will be explained in succession with reference to FIGS. 11A through 11D.

Figure 11A:
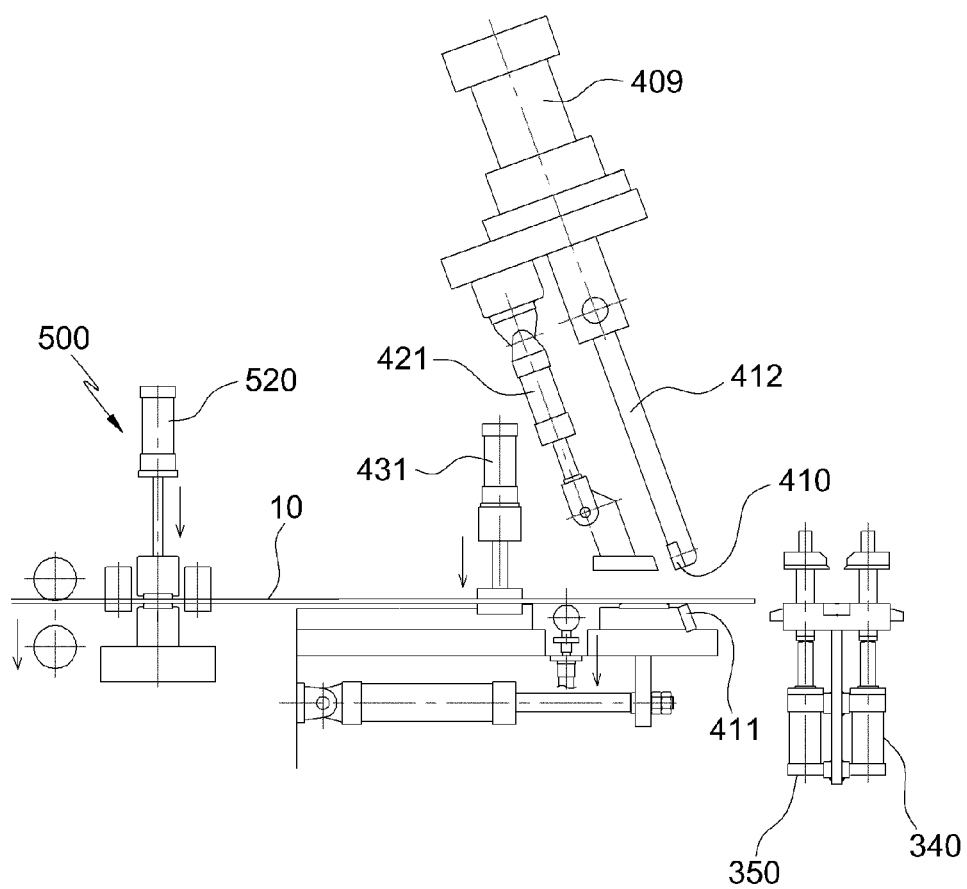

When a sensor (not shown) senses that the trailing end of the preceding steel strip has passed through the first welding clamp 350, the clamping cylinder 520 of the outlet-side guide unit 500 and the vertical cylinder 431 of the first cutting unit 400 are put into operation, clamping the preceding steel strip. FIG. 11A illustrates this state.

Figure 11B:
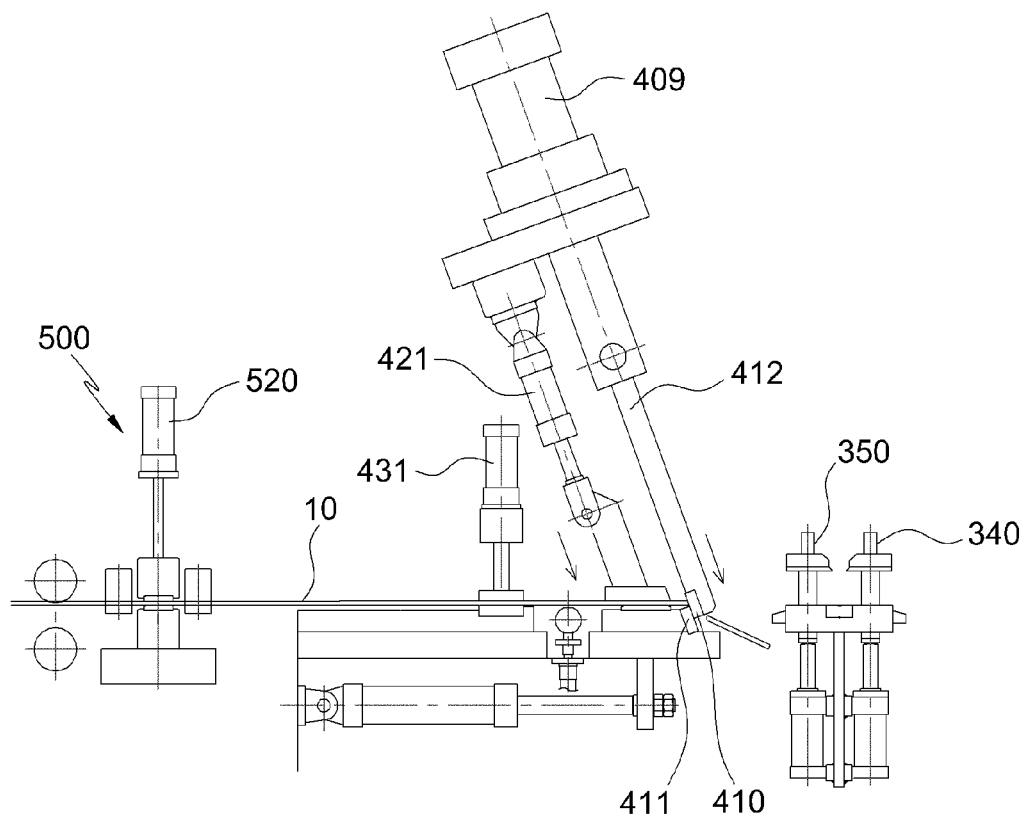
FIG. 11B illustrates the operation of moving an upper blade of the first cutting unit downwards, thus cutting the trailing end of the preceding steel strip.

After the preceding steel strip has stopped, the inclined cylinder 421 of the first cutting unit 400 is put into operation, thus more reliably clamping the preceding steel strip. Simultaneously, the first upper blade 410 of the first cutting unit 400 is moved downwards, thus cutting the trailing end of the preceding steel strip such that the cut surface thereof is inclined at the predetermined angle. FIG. 11B illustrates the operation of cutting the preceding steel strip using the first cutting unit 400.

Figure 11C:
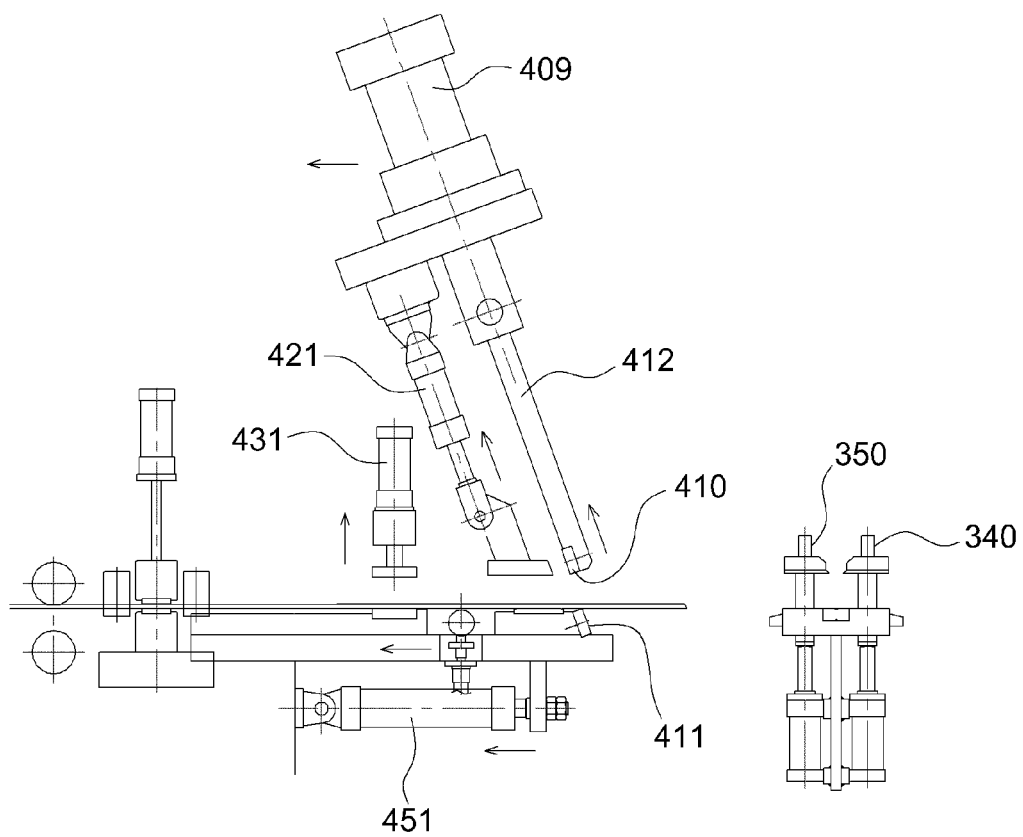
FIG. 11C illustrates the operation in which the first cutting unit has been moved a predetermined distance towards the outlet side so as to clamp the preceding steel strip and move it backwards.

After the trailing end of the preceding steel strip has finished being cut, the piston rods of the inclined cylinder 421 and the cutting-related hydraulic cylinder 409 of the first cutting unit 400 move upwards and return to their original state. The transfer cylinder 451 of the first cutting unit 400 is subsequently operated so that the entirety of the first cutting unit 400 is transferred along the guide 408 of the main frame 1 towards the outlet-side guide unit 500. FIG. 11C shows the state wherein the entirety of the first cutting unit 400 has been transferred a predetermined distance in the direction of the outlet-side guide unit 500.

Figure 11D:
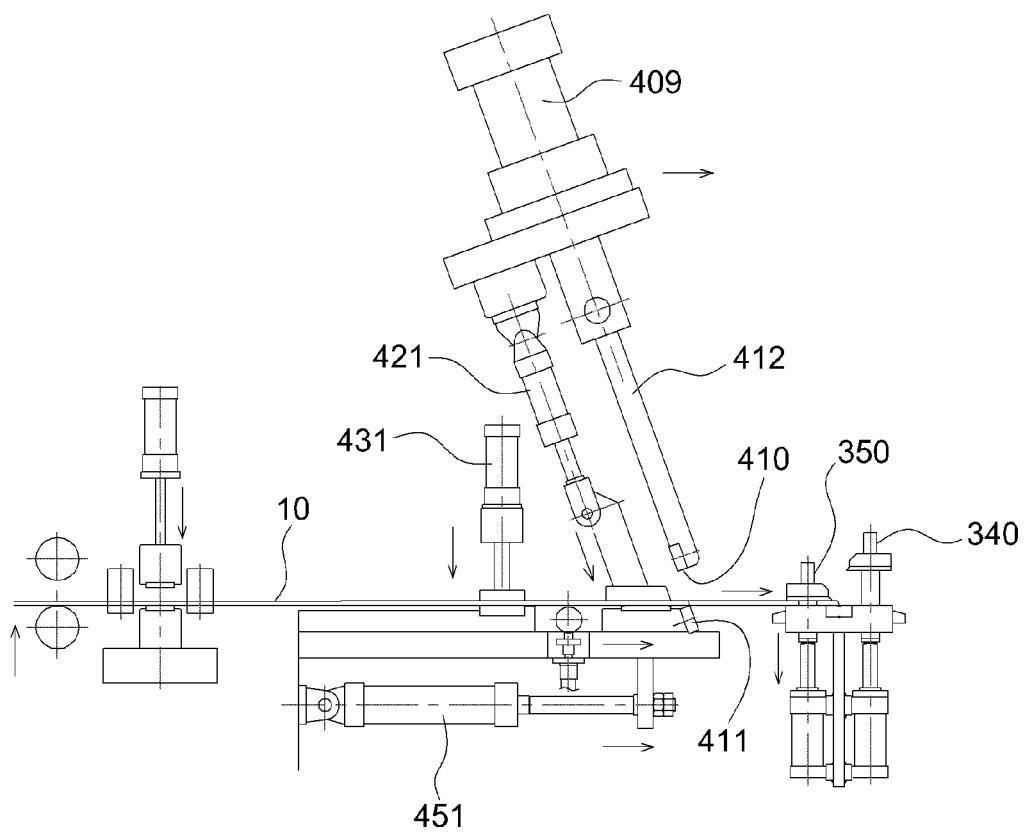
FIG. 11D illustrates the operation of transferring the trailing end of the preceding steel strip to a welding position using the first cutting unit.

After the entirety of the first cutting unit 400 has been transferred by the predetermined distance towards the outlet-side guide unit 500 (refer to FIG. 11C), the piston rods of the vertical cylinder 431 and the inclined cylinder 421 of the first cutting unit 400 move downwards, clamping the preceding steel strip, and the piston rod of the clamping cylinder 520 of the outlet-side guide unit 500 moves upwards, releasing the preceding steel strip. Thereafter, the transfer cylinder 451 of the first cutting unit 400 is operated, transferring the entirety of the first cutting unit 400 to the welding unit 300. Thereby, the cut surface of the trailing end of the preceding steel strip reaches the welding position of the welding unit 300. Subsequently, as shown in FIG. 11D, the first welding clamp 350 is operated, clamping the trailing end of the preceding steel strip.

Next, a process of cutting the leading end of the following steel strip and transferring the leading end of the following steel strip to the welding position will be explained in succession with reference to FIGS. 12A through 12D.

Figure 12A:
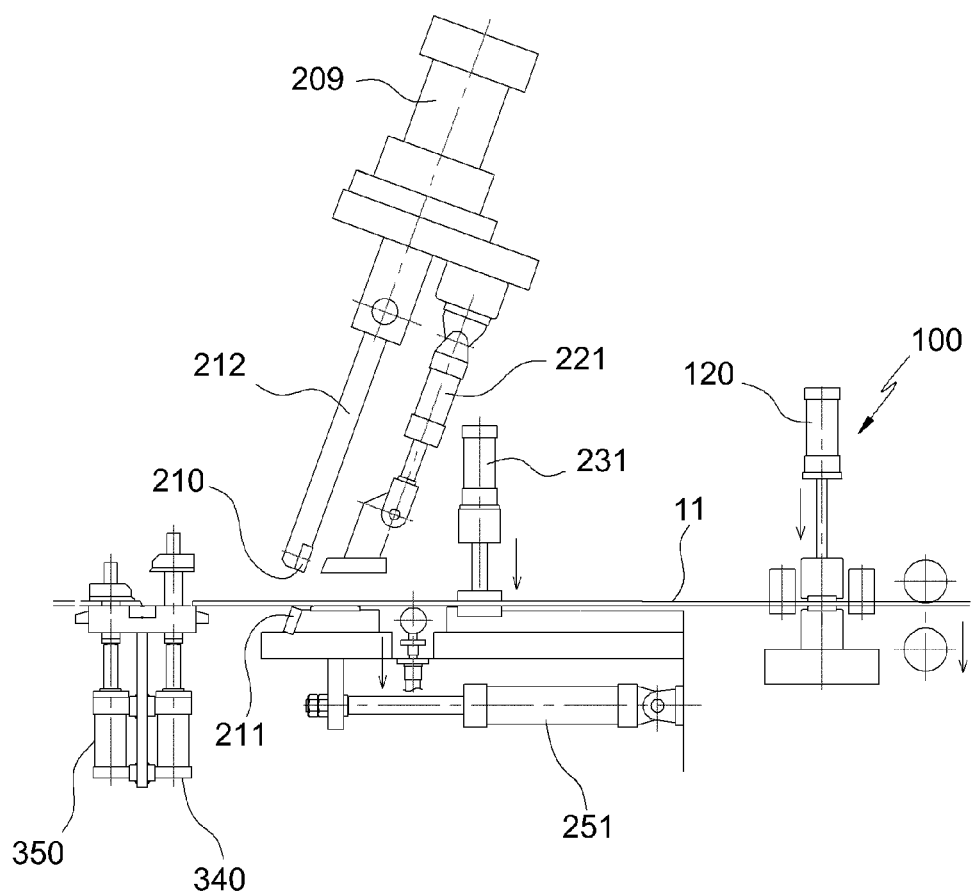
FIG. 12A illustrates the operation in which after the leading end of the following steel strip has reached a second welding clamp, a clamp of the inlet-side guide unit and a vertical clamp of the second cutting unit move downwards, clamping the following steel strip.

When a sensor (not shown) senses that the leading end of the following steel strip has reached the second welding clamp 340, the clamping cylinder 120 of the inlet-side guide unit 100 and the vertical cylinder 231 of the second cutting unit 200 are operated, clamping the following steel strip. FIG. 12A illustrates this state.

Figure 12B:
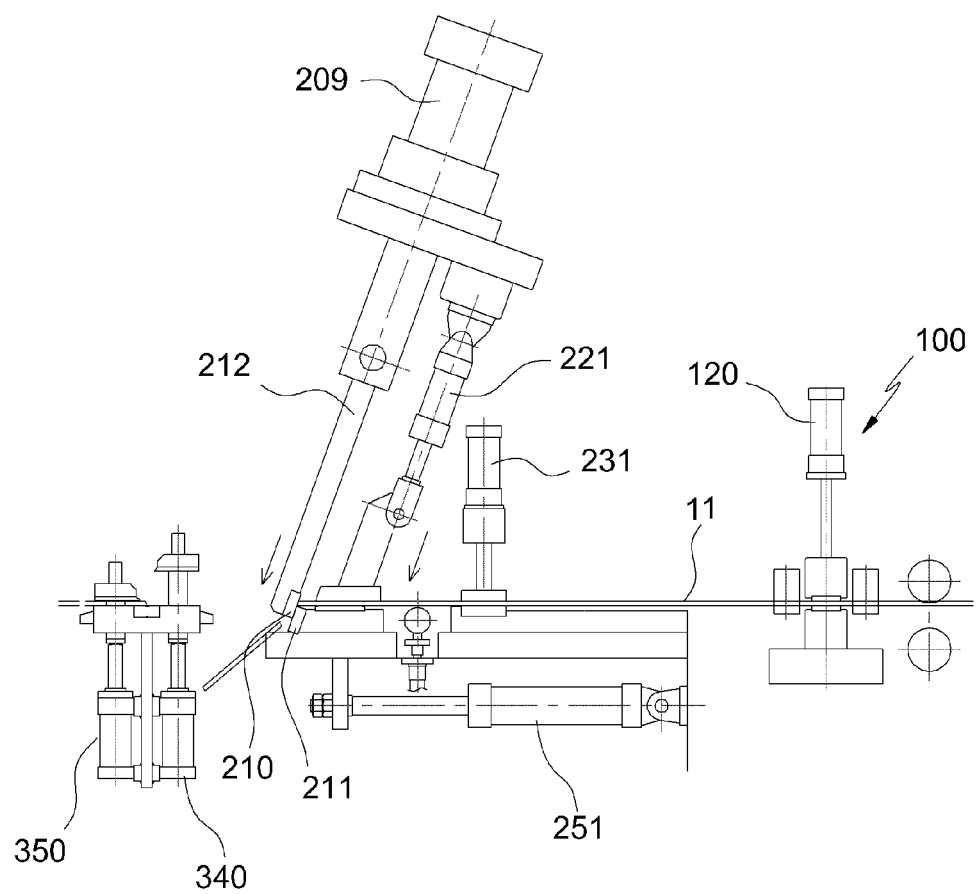
FIG. 12B illustrates the operation of moving an upper blade of the second cutting unit downwards, thus cutting the leading end of the following steel strip.

After the following steel strip has been stopped, the inclined cylinder 221 of the second cutting unit 200 is operated, thus more reliably clamping the following steel strip. Simultaneously, the second upper blade 210 of the second cutting unit 200 is moved downwards, thus cutting the leading end of the following steel strip such that the cut surface thereof is inclined by the predetermined angle. FIG. 12B illustrates the operation of cutting the following steel strip using the second cutting unit 200.

Figure 12C:
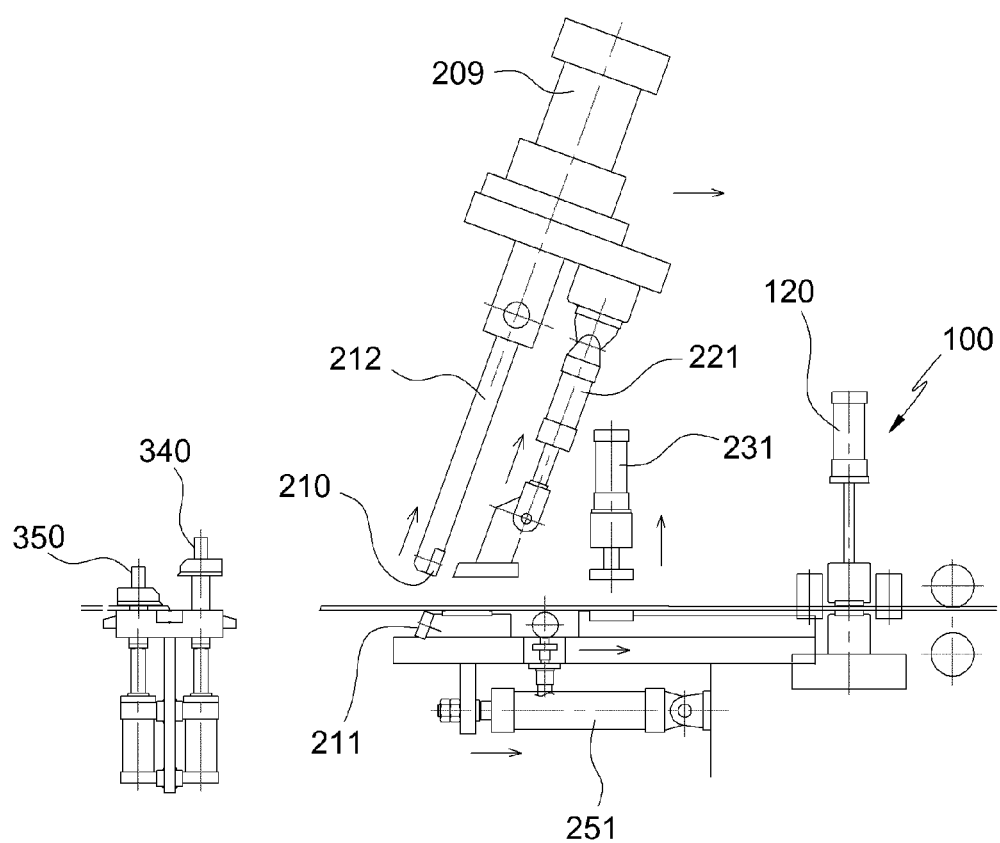
FIG. 12C illustrates the operation in which the second cutting unit has been moved to a predetermined distance towards the inlet side so as to clamp the following steel strip and move it forwards.

After the leading end of the following steel strip has finished being cut, the piston rods of the inclined cylinder 221 and the cutting-related hydraulic cylinder 209 of the second cutting unit 200 move upwards and return to their original state. The transfer cylinder 251 of the second cutting unit 200 is subsequently operated so that the entirety of the second cutting unit 200 is transferred along the guide 208 of the main frame 1 towards the inlet-side guide unit 100. FIG. 12C shows the state wherein the entirety of the second cutting unit 200 has been transferred a predetermined distance towards the inlet-side guide unit 100.

Figure 12D:
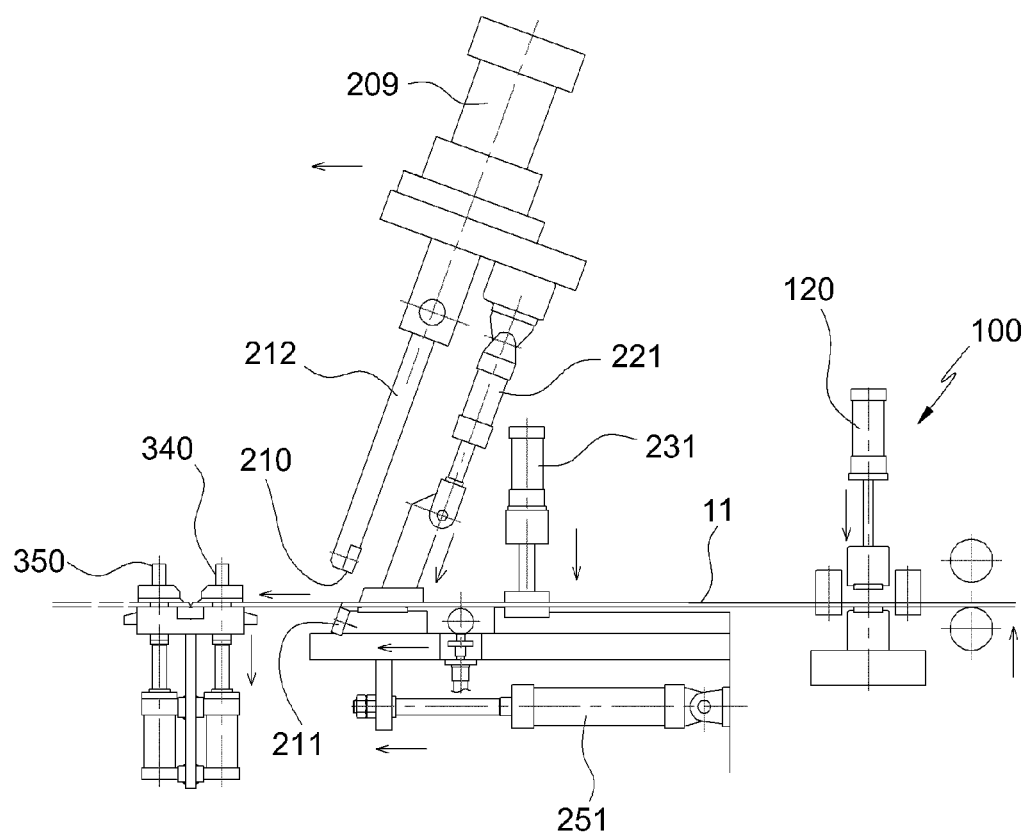

After the entirety of the second cutting unit 200 has been transferred by the predetermined distance towards the inlet-side guide unit 100 (refer to FIG. 12C), the piston rods of the vertical cylinder 231 and the inclined cylinder 221 of the second cutting unit 200 move downwards, clamping the following steel strip, and the piston rod of the clamping cylinder 120 of the inlet-side guide unit 100 moves upwards, releasing the following steel strip. Thereafter, the transfer cylinder 251 of the second cutting unit 200 is operated, transferring the entirety of the second cutting unit 200 to the welding unit 300. Thereby, the cut surface of the leading end of the following steel strip reaches the welding position of the welding unit 300. Subsequently, as shown in FIG. 12D, the second welding clamp 340 is operated, clamping the leading end of the following steel strip.

By conducting the series of operations shown in FIGS. 11A through 12D, the preparations for joining the two steel strips to each other have been completed.

Figure 13:
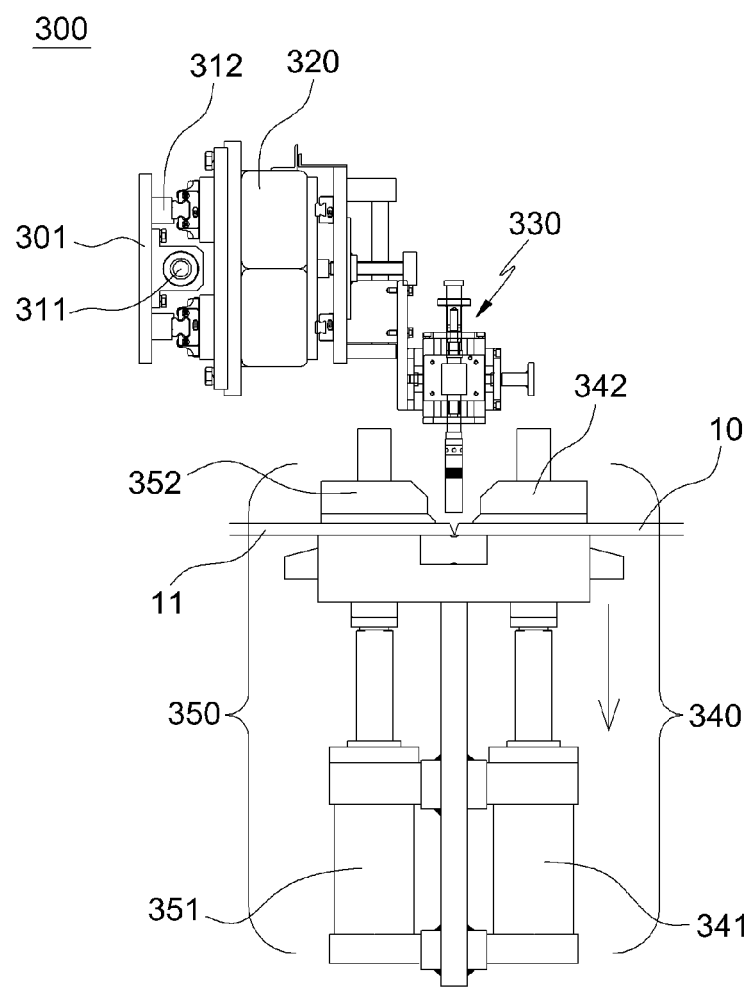
FIG. 13 illustrates the operation of welding, using the welding unit, the two steel strips that have been clamped by the welding clamps and been put into contact with each other.

FIG. 13 illustrates the operation of welding, using the welding unit 300, the two steel strips 10 and 11 that have been clamped by the welding clamps 350 and been put into contact with each other. The welding torch is moved downwards by a pneumatic cylinder of the welding module 330, and then the welding operation is carried out at a predetermined speed. After the welding operation has finished, the welding torch automatically moves upwards, returning to its original position. The structure and operation of the welding unit 300 are the same as those of the typical welding device, therefore the detailed description thereof will be omitted in this specification.

After the welding operation using the welding unit 300 of FIG. 13 has finished, the elements of the strip joining apparatus according to the present invention return to their basic positions shown in FIG. 10, after which the steel strips enter the state of normal transfer of the steel strips.

As described above, a strip joining apparatus for pipe mill equipment according to the present invention is configured such that the trailing end and the leading end of the two steel strips are cut at inclined angles so that the trailing end and the leading end form a 'V' shape when they are put into contact with each other to be welded. Therefore, the operation of welding the following steel strip to the preceding steel strip can be rapidly conducted without interrupting the operation of the pipe mill equipment. Further, the quality of the welded junction between the two steel strips can be enhanced.

Although the preferred embodiment of the strip joining apparatus for pipe mill equipment according to the present invention has been disclosed for illustrative purposes, those skilled in the art will appreciate that various modifications, additions and substitutions are possible, without departing from the scope and spirit of the invention as disclosed in the accompanying claims.

What is claimed is:

1. A strip joining apparatus for pipe mill equipment, comprising:
   a first cutting unit cutting a trailing end of a preceding steel strip, the first cutting unit comprising: a vertical clamp vertically pressing and clamping the trailing end of the preceding steel strip; and a first upper blade moving upwards and downwards, thus cutting the preceding steel strip;
   a second cutting unit cutting a leading end of a following steel strip, the second cutting unit comprising a vertical clamp vertically pressing and clamping the leading end of the following steel strip; and a second upper blade moving upwards and downwards, thus cutting the following steel strip;

a first transfer unit transferring the first cutting unit forwards or backwards with respect to a direction in which the preceding steel strip is transferred;

a second transfer unit transferring the second cutting unit forwards or backwards with respect to a direction in which the following steel strip is transferred; and a welding unit disposed between the first cutting unit and the second cutting unit, the welding unit welding cut surfaces of the preceding and following steel strips that have been moved next to each other by the first transfer unit and the second transfer unit and put into contact with each other, thus joining the cut surfaces of the preceding and following steel strips to each other, wherein the first upper blade and the second upper blade are inclined downwards and face each other, so that the trailing end of the preceding steel strip and the leading end of the following steel strip that are respectively cut by the inclined first and second upper blades are put into contact with each other in a 'V' shape, before the trailing end and the leading end are welded to each other by the welding unit, and wherein the first cutting unit further comprises a first inclined clamp disposed on a lower surface of a first lower horizontal frame inclined in a direction parallel to a direction in which the first upper blade moves to cut the preceding steel strip, and a first holder supporting the first upper blade is disposed on an upper surface of the first lower horizontal frame which faces opposite to the lower surface of a first lower horizontal frame, and wherein the second cutting unit further comprises a second inclined clamp disposed on a lower surface of a second lower horizontal frame inclined in a direction parallel to a direction in which the second upper blade moves to cut the following steel strip, a second holder supporting the second upper blade is disposed on an upper surface of the second lower horizontal frame which faces opposite to the lower surface of a second lower horizontal frame, and the second inclined clamp presses and clamps the leading end of the following steel strip.

2. The strip joining apparatus as set forth in claim 1, wherein the upper blade and a lower blade of the first cutting unit, the upper blade and a lower blade of the second cutting unit, and a welding line of the welding unit are oriented at an angle with respect to an imaginary reference line provided in a lateral direction on a horizontal plane of the steel strips.

3. The strip joining apparatus as set forth in claim 2, wherein the first transfer unit transferring the first cutting unit forwards or backwards with respect to the direction in which the preceding steel strip is transferred, comprises:

a bracket protruding from a lower surface of a base frame; and a pair of first transfer cylinders fixed to a main frame below the base frame, the first transfer cylinders having respective piston rods, ends of the piston rods being hinged to the bracket, wherein the ends of the piston rods of the first transfer cylinders are coupled to the bracket protruding from the lower surface of the base frame, whereby the first transfer cylinders are able to move the entirety of the first cutting unit along a guide of the main frame forwards or backwards with respect to the direction in which the preceding steel strip is transferred, and the second transfer unit transferring the second cutting unit forwards or backwards with respect to the direction in which the following steel strip is transferred has a same construction as the first transfer unit and is symmetrical with the first transfer unit, whereby second transfer cylinders are able to move the entirety of the second cutting unit along a guide of the main frame forwards or backwards with respect to the direction in which the following steel strip is being transferred.

4. The strip joining apparatus as set forth in claim 3, further comprising a transfer limitation position adjusting unit precisely adjusting a transfer limitation position of the first cutting unit, the transfer limitation position adjusting unit comprising:
an adjustment handle provided at a predetermined position on the main frame;
a handle shaft transmitting a rotating force of the adjustment handle to a worm provided in a gear box;
a worm wheel provided in the gear box, the worm wheel engaging with the worm;
a transfer guide shaft threadedly coupled at a first end thereof to the worm wheel, the transfer guide shaft being received at a second end thereof in a guide block protruding from the lower surface of the base frame, with a slot formed in the transfer guide shaft, the slot extending a predetermined length in a longitudinal direction of the transfer guide shaft; and
a key installed on the guide block and received in the slot of the transfer guide shaft, the key moving along the slot.

5. The strip joining apparatus as set forth in claim 1, wherein the first transfer unit transferring the first cutting unit forwards or backwards with respect to the direction in which the preceding steel strip is transferred, comprises:

a bracket protruding from a lower surface of a base frame; and a pair of first transfer cylinders fixed to a main frame below the base frame, the first transfer cylinders having respective piston rods, ends of the piston rods being hinged to the bracket, wherein the ends of the piston rods of the first transfer cylinders are coupled to the bracket protruding from the lower surface of the base frame, whereby the first transfer cylinders are able to move the entirety of the first cutting unit along a guide of the main frame forwards or backwards with respect to the direction in which the preceding steel strip is transferred, and the second transfer unit transferring the second cutting unit forwards or backwards with respect to the direction in which the following steel strip is transferred has a same construction as the first transfer unit and is symmetrical with the first transfer unit, whereby second transfer cylinders are able to move the entirety of the second cutting unit along a guide of the main frame forwards or backwards with respect to the direction in which the following steel strip is being transferred.

6. The strip joining apparatus as set forth in claim 5, further comprising a transfer limitation position adjusting unit precisely adjusting a transfer limitation position of the first cutting unit, the transfer limitation position adjusting unit comprising:
an adjustment handle provided at a predetermined position on the main frame;
a handle shaft transmitting a rotating force of the adjustment handle to a worm provided in a gear box;
a worm wheel provided in the gear box, the worm wheel engaging with the worm;
a transfer guide shaft threadedly coupled at a first end thereof to the worm wheel, the transfer guide shaft being received at a second end thereof in a guide block protruding from the lower surface of the base frame, with a slot formed in the transfer guide shaft, the slot extending a predetermined length in a longitudinal direction of the transfer guide shaft; and
a key installed on the guide block and received in the slot of the transfer guide shaft, the key moving along the slot.

* * * * *